US012695989B2

(12) United States Patent
Bong et al.

(10) Patent No.: US 12,695,989 B2
(45) Date of Patent: Jul. 28, 2026

(54) LENS DRIVING DEVICE AND CAMERA MODULE COMPRISING SAME

(71) Applicant: LG INNOTEK CO., LTD., Seoul (KR)

(72) Inventors: Sang Hoon Bong, Seoul (KR); Yun Sang Song, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 204 days.

(21) Appl. No.: 18/293,950

(22) PCT Filed: Aug. 10, 2022

(86) PCT No.: PCT/KR2022/011908
§ 371 (c)(1),
(2) Date: Jan. 31, 2024

(87) PCT Pub. No.: WO2023/018213
PCT Pub. Date: Feb. 16, 2023

(65) Prior Publication Data
US 2025/0076731 A1     Mar. 6, 2025

(30) Foreign Application Priority Data

Aug. 12, 2021     (KR) ......................... 10-2021-0106584

(51) Int. Cl.
| | |
|---|---|
| *H04N 23/68* | (2023.01) |
| *G02B 27/64* | (2006.01) |
| *G03B 5/00* | (2021.01) |
| *G03B 17/12* | (2021.01) |
| *H04N 23/55* | (2023.01) |

(52) U.S. Cl.
CPC ......... *H04N 23/686* (2023.01); *G02B 27/646* (2013.01); *G03B 5/00* (2013.01); *G03B 17/12* (2013.01); *H04N 23/55* (2023.01); *H04N 23/687* (2023.01); *G03B 2205/0007* (2013.01); *G03B 2205/0069* (2013.01)

(58) Field of Classification Search
CPC .. H04N 23/686; H04N 23/687; H04N 23/685; G02B 27/646; G03B 5/00; G03B 17/12
See application file for complete search history.

(56) References Cited

U.S. PATENT DOCUMENTS

2023/0164415 A1* 5/2023 Hegels ................... G03B 30/00
348/335

FOREIGN PATENT DOCUMENTS

| JP | 2005-517292 | 6/2005 |
|---|---|---|
| JP | 2009-063827 | 3/2009 |

(Continued)

OTHER PUBLICATIONS

International Search Report dated Nov. 11, 2022 issued in Application No. PCT/KR2022/011908.

*Primary Examiner* — Nicholas G Giles
(74) *Attorney, Agent, or Firm* — KED & ASSOCIATES, LLP

(57) ABSTRACT

A lens driving device according to an embodiment of the present invention comprises: a first lens; and an optical path-changing member that changes the path of light incident from the first lens and emits same, wherein the first lens and the optical path-changing member are arranged so as to be tilted simultaneously with respect to a first axis and to be tilted separately with respect to a second axis.

11 Claims, 30 Drawing Sheets

2700 : 2710, 2720, 2730, 2740
2800 : 2810, 2820
2900 : 2910, 2920

(56)         References Cited

FOREIGN PATENT DOCUMENTS

KR      10-2019-0129799       11/2019
KR           10-2100195        4/2020
KR      10-2021-0054716        5/2021
WO      WO-2022011691 A1 *   1/2022   ............ H04N 23/55

* cited by examiner

2000

RX1

RX2

2000

2100

2200

2300

2400

2500

2710

2600

2910

2740

2810

2720

2730

2820

2920

2700 : 2710, 2720, 2730, 2740
2800 : 2810, 2820
2900 : 2910, 2920

<u>2400</u>

2500

2500

2600

LENS DRIVING DEVICE AND CAMERA MODULE COMPRISING SAME

CROSS-REFERENCE TO RELATED PATENT APPLICATIONS

This application is a U.S. National Stage Application under 35 U.S.C. § 371 of PCT Application No. PCT/KR2022/011908, filed Aug. 10, 2022, which claims priority to Korean Patent Application No. 10-2021-0106584, filed Aug. 12, 2021, whose entire disclosures are hereby incorporated by reference.

TECHNICAL FIELD

The present invention relates to a lens driving device and a camera module including the same.

BACKGROUND ART

A camera is a device for taking pictures or videos by capturing images of subjects and is mounted on mobile devices, drones, vehicles, or the like. In order to improve the quality of the image, a camera device may have an image stabilizer (IS) function for correcting or preventing an image shake caused by the movement of a user, an auto focusing (AF) function for aligning a focal length of a lens by automatically adjusting an interval between an image sensor and the lens, and a zooming function for capturing an image of a remote subject by increasing or decreasing the magnification of the remote subject through a zoom lens.

Meanwhile, a pixel density of the image sensor increases as a resolution of the camera increases, and thus a size of the pixel becomes smaller, and as the pixel becomes smaller, the amount of light received for the same time decreases. Therefore, as the camera has a higher pixel density, the image shake caused by hand shaking due to a shutter speed decreased in a dark environment may more severely occur. As a representative IS technique, there is an optical image stabilizer (OIS) technique of correcting motion by changing a path of light.

According to the general OIS technique, the motion of the camera may be detected through a gyro sensor or the like, and a lens may tilt or move, or a camera module including a lens and an image sensor may tilt or move based on the detected motion. When the lens or the camera module including the lens and the image sensor tilts or moves for an OIS, it is necessary to additionally secure a space for tilting or moving around the lens or the camera module.

Meanwhile, an actuator for the OIS may be disposed around the lens. In this case, the actuator for the OIS may include actuators, which are in charge of tilting of two axes perpendicular to an optical axis Z, that is, an actuator in charge of an X-axis tilting and an actuator in charge of a Y-axis tiling.

However, according to the needs of ultra-slim and ultra-small camera modules, there is a large space constraint for arranging the actuator for the OIS, and it may be difficult to secure a sufficient space for the OIS where the lens or the camera module including the lens and the image sensor itself may be tilted or moved. In addition, as the camera has a higher pixel density, it is preferable that a size of the lens be increased to increase the amount of received light, and there may be a limit to increasing the size of the lens due to a space occupied by the actuator for the OIS.

In addition, since it is not possible to secure the sufficient amount of light according to the miniaturization of the camera device, a problem that the quality of images is degraded occurs.

DISCLOSURE

Technical Problem

Embodiments are directed to providing a camera actuator capable of implementing an optical image stabilizer (OIS) function for securing the sufficient amount of light.

The embodiments are also directed to providing a camera device including the camera actuator capable of implementing the OIS function for securing the sufficient amount of light.

The object of embodiments is not limited thereto and may also include objects or effects that may be identified from the configurations or embodiments to be described below.

Technical Solution

A lens driving device according to an embodiment of the present invention includes a first lens, and an optical path changing member configured to change a path of light incident from the first lens and emit the light, wherein the first lens and the optical path changing member are disposed to be simultaneously tilted about a first axis, and the first lens and the optical path changing member are disposed to be individually tilted about a second axis.

The lens driving device may include a lens holder on which the first lens is disposed, and a support member on which the lens holder is disposed, wherein the lens holder may be supported by the support member.

The lens driving device may include an optical path changing member holder on which the optical path changing member is disposed, wherein the optical path changing member may be supported by the support member.

The lens holder and the optical path changing member may be disposed to be supported by the support member to be individually tilted about the first axis.

The support member may include a plurality of first support portions disposed to be spaced apart from each other in a direction toward the second axis, and the lens holder and the optical path changing member may be simultaneously supported by the plurality of first support portions.

The lens driving device may include a frame on which a plurality of coils and the support member are disposed, wherein the support member may include a second support portion supported by the frame to be tilted about the first axis, and the second support portion may be provided as a single support portion extending along the second axis or a plurality of support portions disposed along the second axis.

The lens driving device may include a first magnet disposed on the support member, a second magnet disposed on the optical path changing member holder, and a third magnet disposed on the lens holder, wherein the plurality of coils may include first to third coils respectively corresponding to the first to third magnets.

A side surface of the lens holder may be disposed to be spaced a predetermined distance from a corresponding side surface of the frame.

The predetermined distance may be in a range of 0.2 to 1.0 mm.

A lower surface of the support member may be disposed to be spaced a predetermined distance from a corresponding one surface of the frame.

The predetermined distance may be in a range of 0.2 to 1.0 mm.

The frame may include an accommodating groove that accommodates the second support portion, and a bottom surface of the accommodating groove and the second support portion may be spaced a predetermined distance from each other.

The predetermined distance may be 1.0 mm or more.

The second support portion may be formed in a hemispherical shape with a predetermined radius, and the predetermined radius may be greater than a depth of the accommodating groove.

A difference value between the predetermined radius and the depth of the accommodating groove may be in a range of 0.15 to 0.3 mm.

A lens driving device according to an embodiment of the present invention includes a first lens, an optical path changing member configured to change a path of light incident from the first lens and emit the light, and a driving unit configured to drive the first lens, wherein the first lens may be tilted by the driving unit.

A lens driving device according to an embodiment of the present invention includes a first lens, a lens holder on which the first lens is disposed, an optical path changing member configured to change a path of light incident from the first lens and emit the light, an optical path changing member holder on which the optical path changing member is disposed, and a support member on which the lens holder and the optical path changing member holder are disposed, wherein the support member includes a plurality of support portions disposed to be spaced apart from each other in a direction toward a first axis, and the lens holder and the optical path changing member are disposed to be supported by the support portion.

Advantageous Effects

According to embodiments, even when a camera device is miniaturized, it is possible to secure the sufficient amount of light.

It is possible to improve optical performance by independently rotating an optical member and an optical path changing member disposed for securing the amount of light.

Various and beneficial advantages and effects of the present invention are not limited to the above-described contents and will be more readily understood in a process of describing specific embodiments of the present invention.

4

Figure 7A:
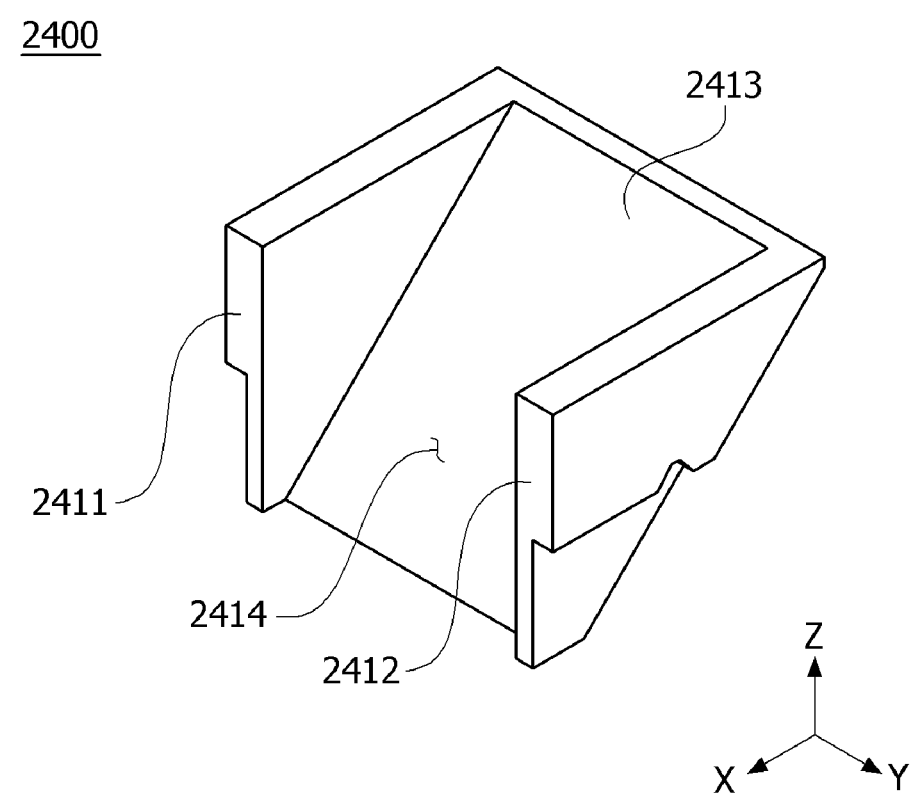

FIG. 7A is a perspective view of an optical path changing member holder according to the embodiment of the present invention.

Figure 7B:
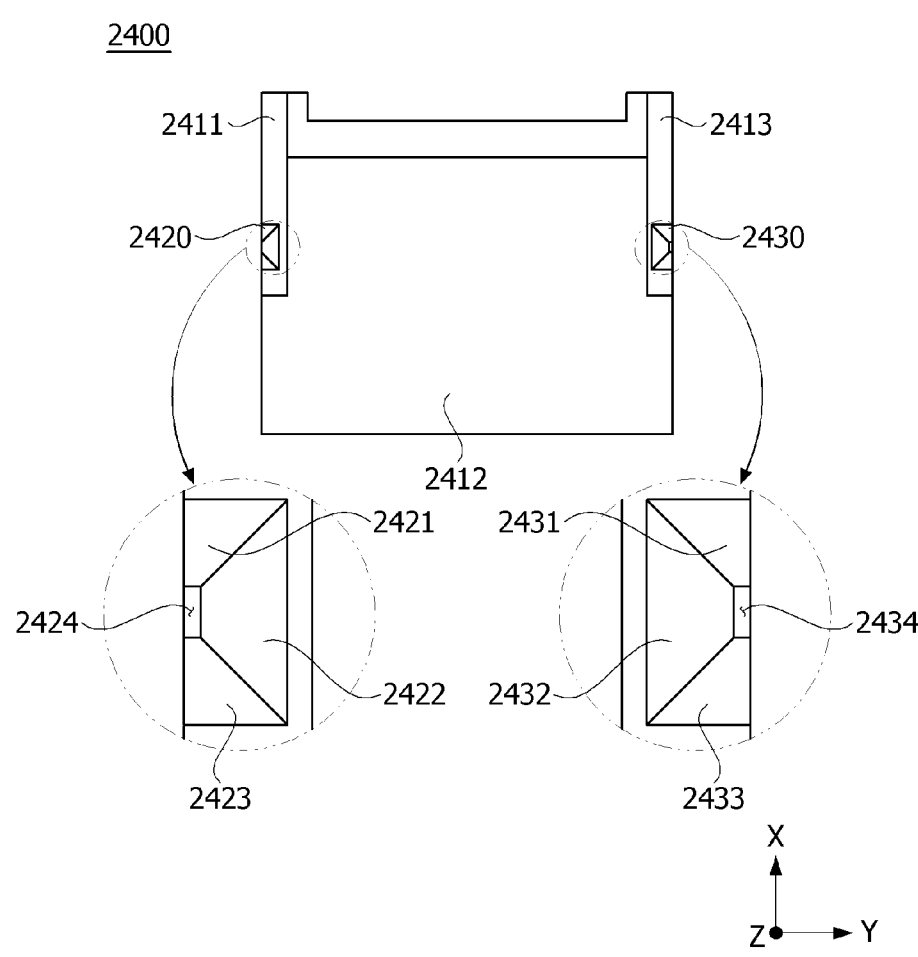

FIG. 7B is a rear view of the optical path changing member holder according to the embodiment of the present invention.

Figure 8A:
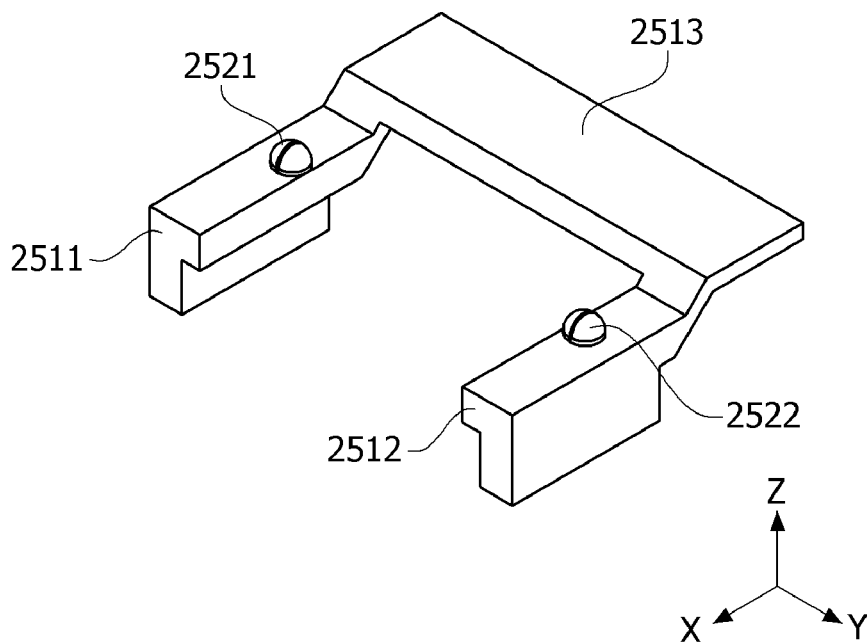

FIG. 8A is a perspective view of a support member according to the embodiment of the present invention.

Figure 8B:
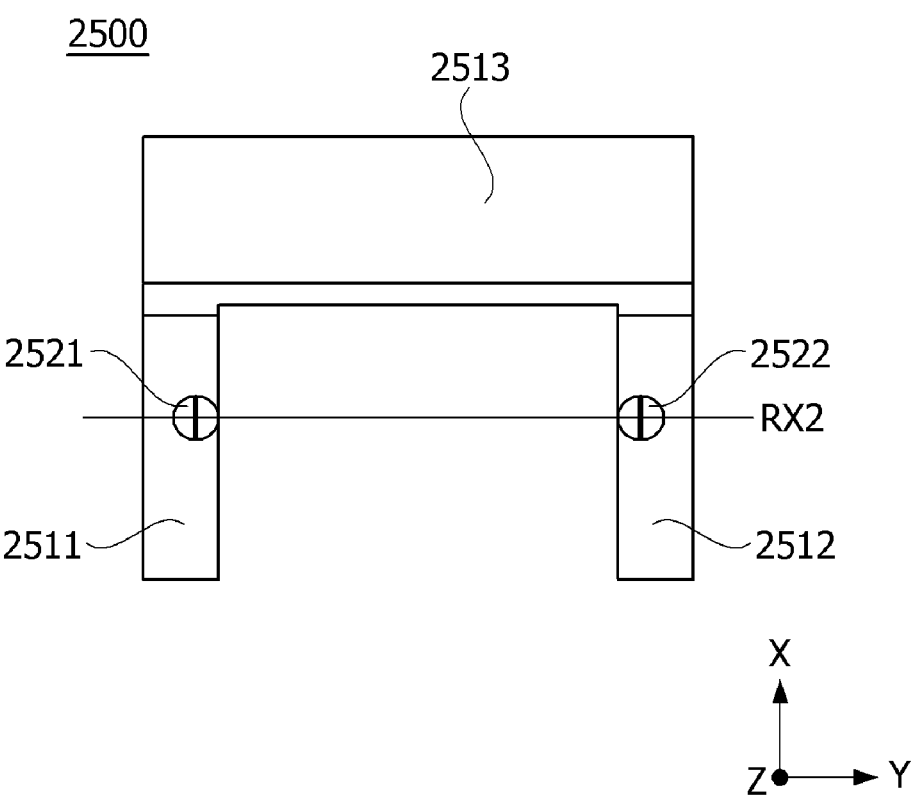

FIG. 8B is a plan view of the support member according to the embodiment of the present invention.

Figure 8C:
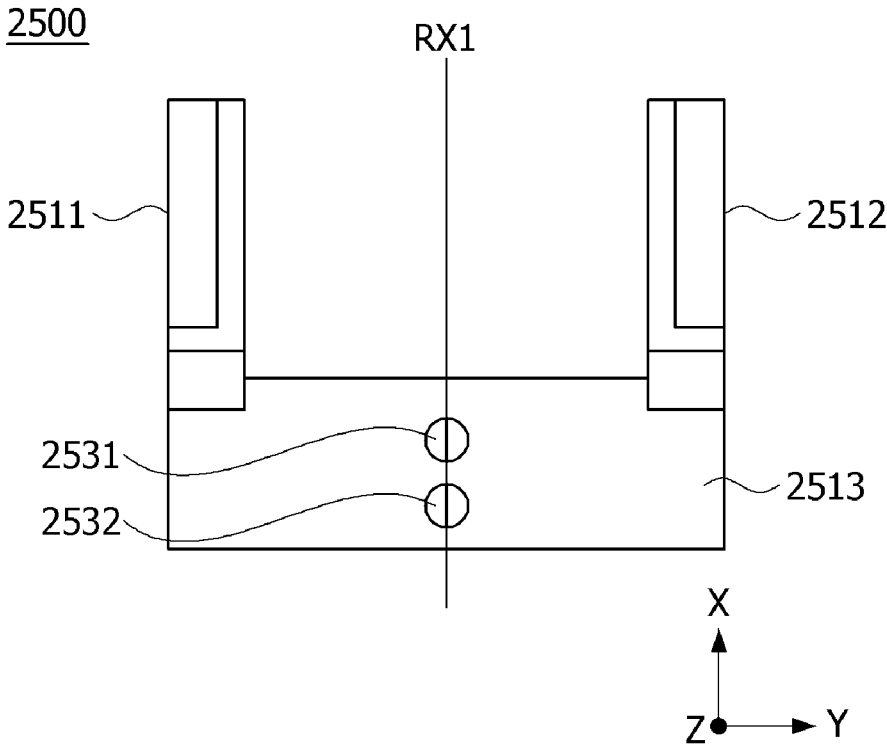

FIG. 8C is a rear view of the support member according to the embodiment of the present invention.

Figure 8D:
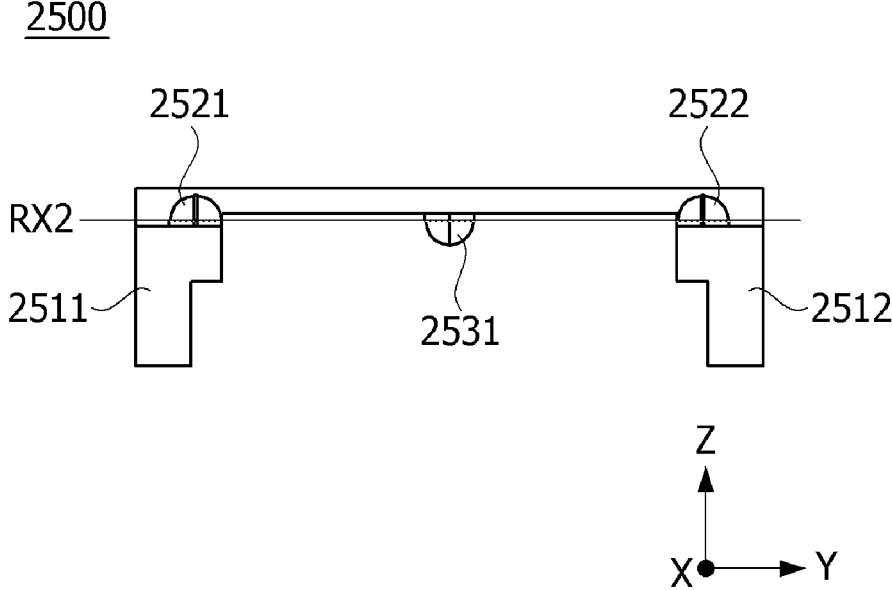

FIG. 8D is a front view of the support member according to the embodiment of the present invention.

Figure 8E:
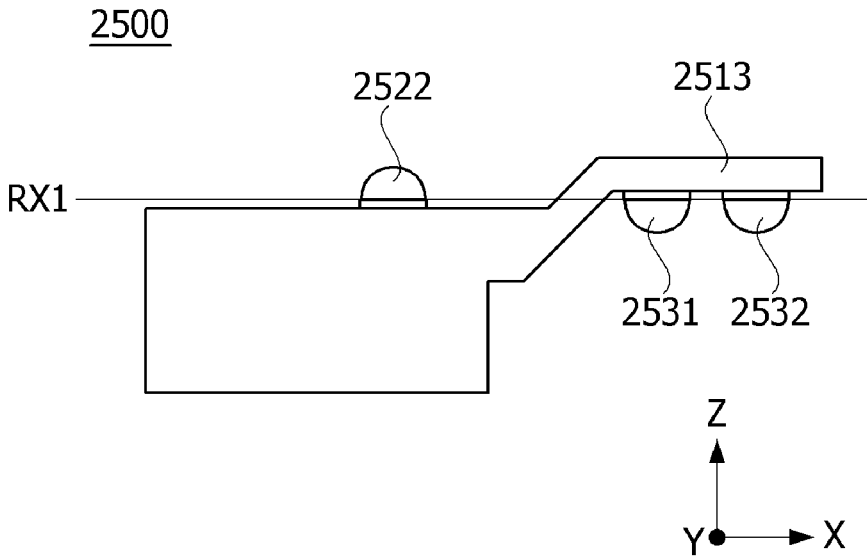

FIG. 8E is a side view of the support member according to the embodiment of the present invention.

Figure 9A:
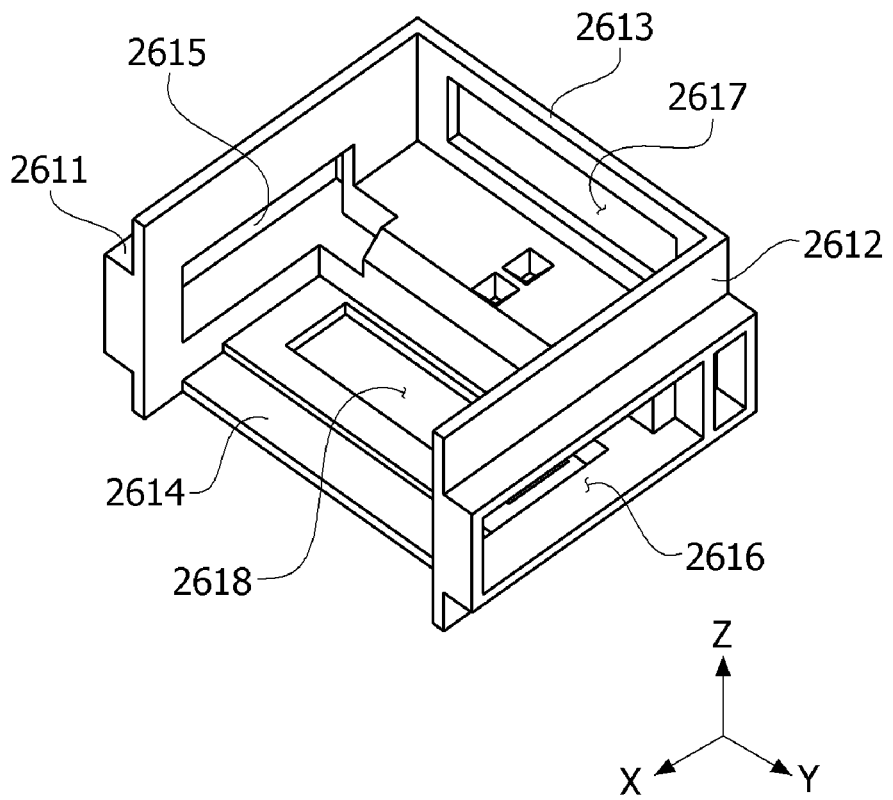

FIG. 9A is a perspective view of a frame according to the embodiment of the present invention.

Figure 9B:
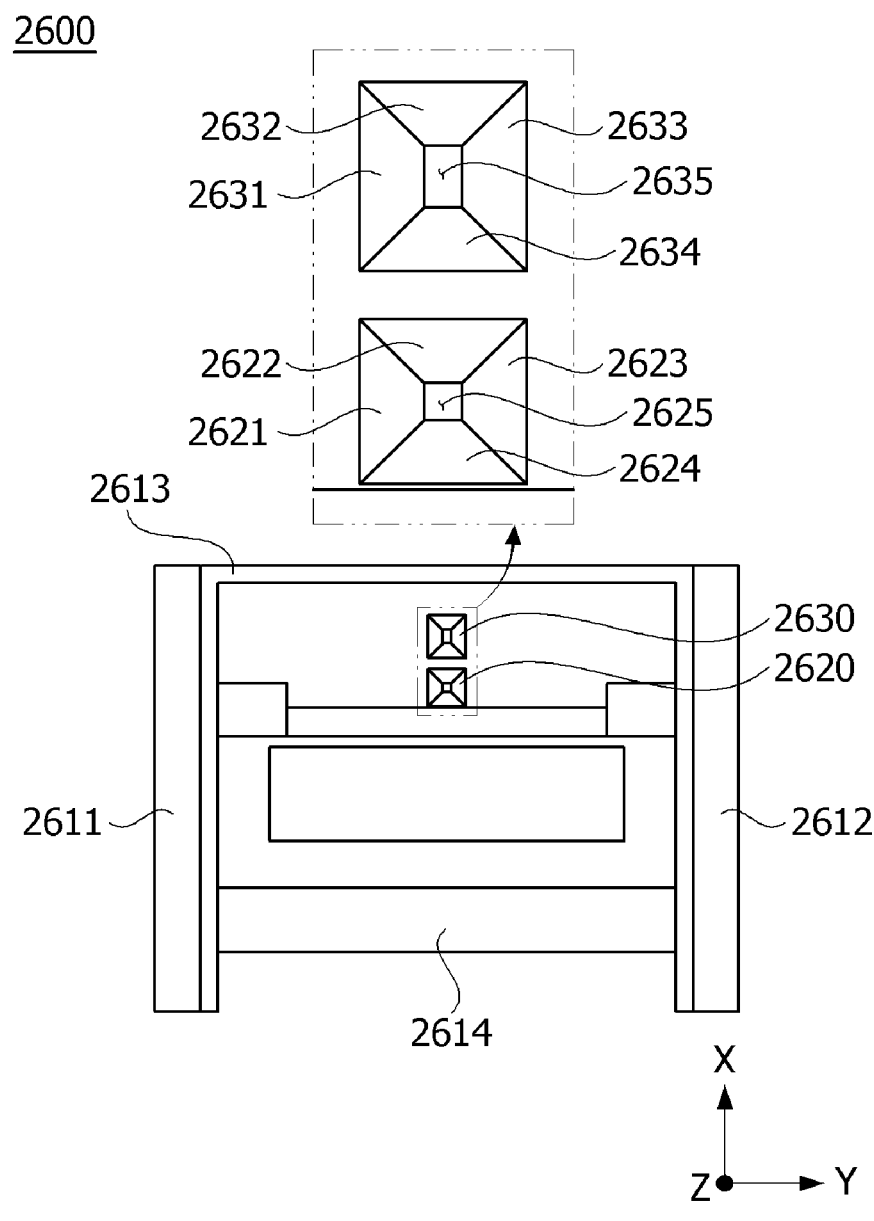

FIG. 9B is a plan view of the frame according to the embodiment of the present invention.

Figure 10:
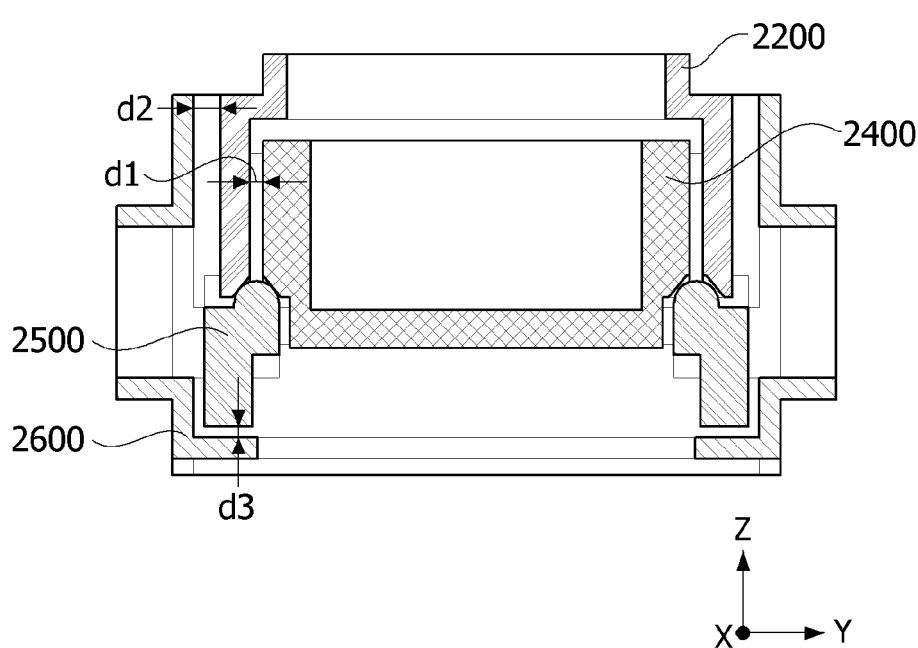

FIG. 10 is a first cross-sectional view of the lens driving device according to the embodiment of the present invention.

Figure 11:
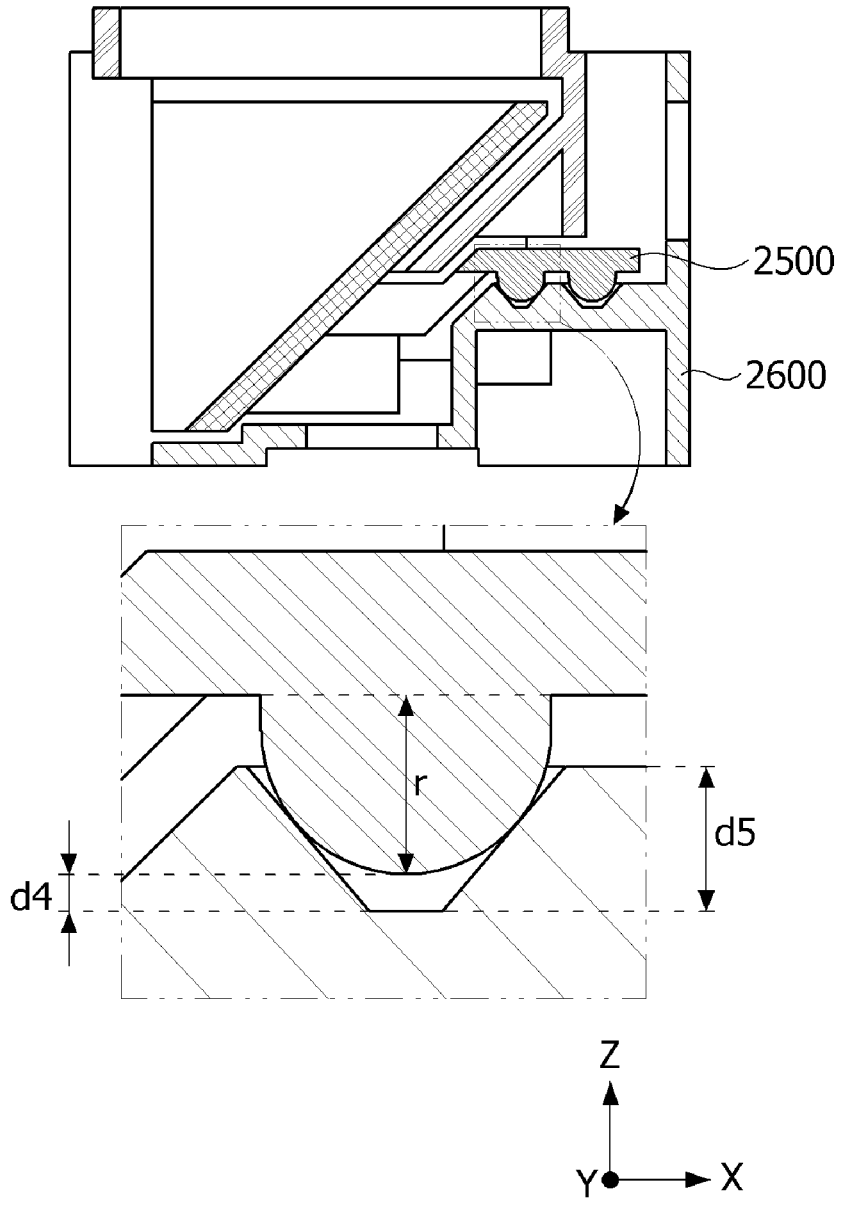

FIG. 11 is a second cross-sectional view of the lens driving device according to the embodiment of the present invention.

Figure 12A:
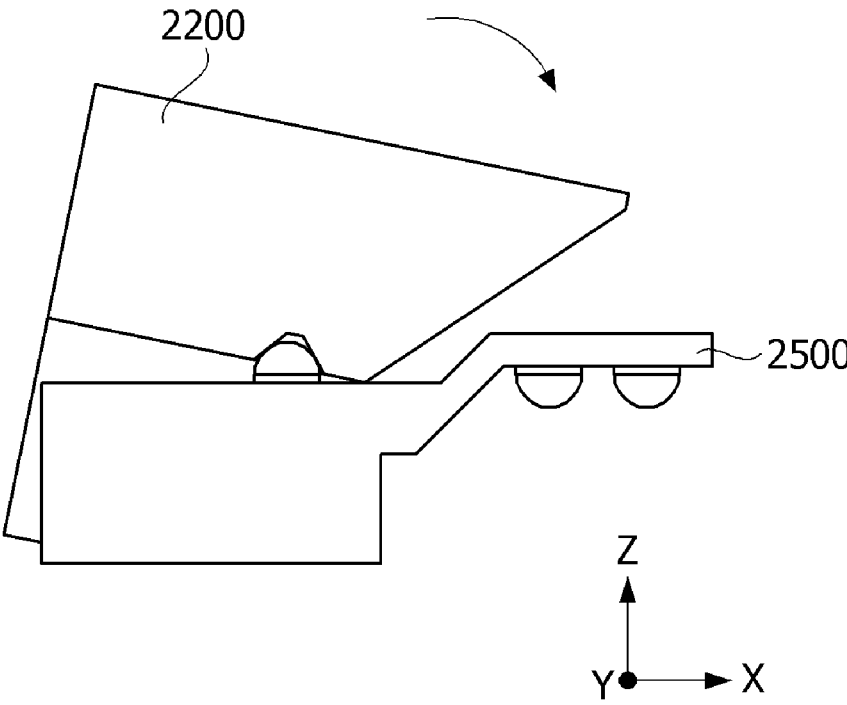
Figure 12B:
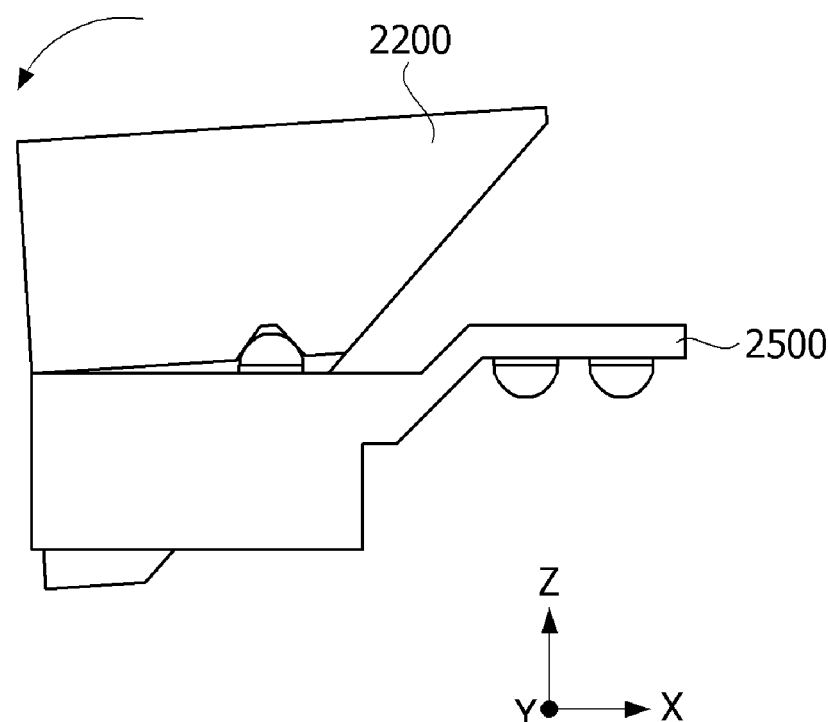

FIGS. 12A and 12B are views for describing a rotating process of the lens holder according to the embodiment of the present invention.

Figure 13A:
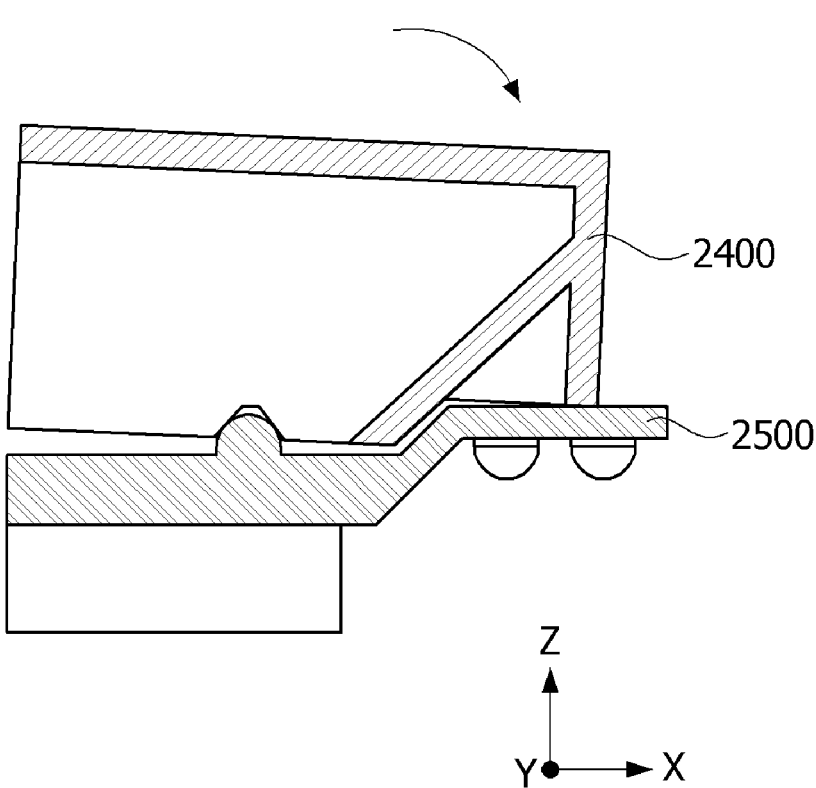
Figure 13B:
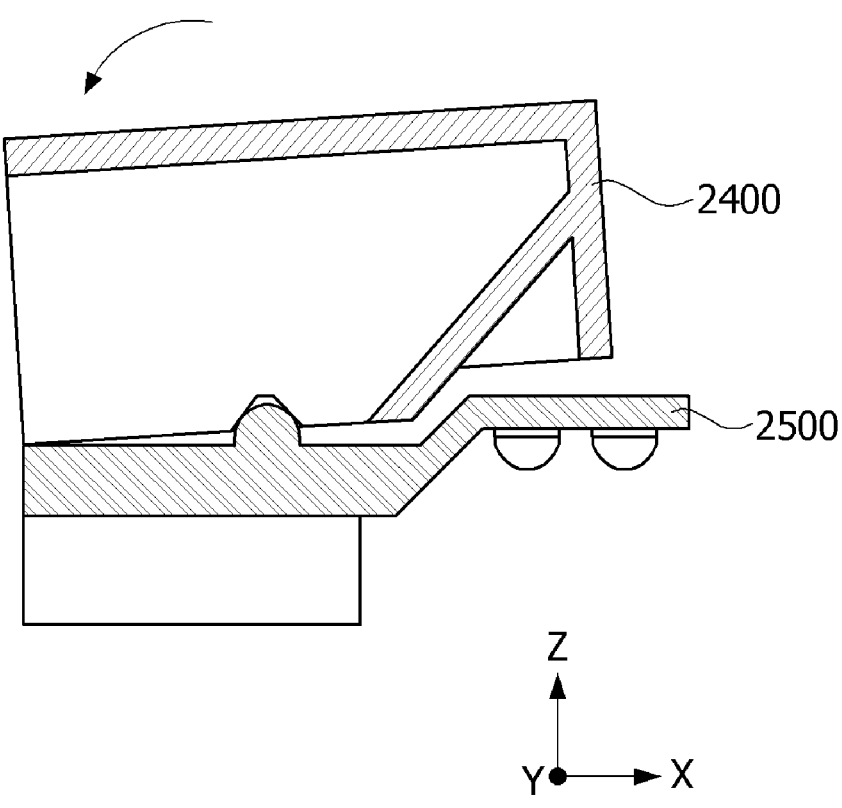

FIGS. 13A and 13B are views for describing a rotating process of the optical path changing member holder according to the embodiment of the present invention.

Figure 14A:
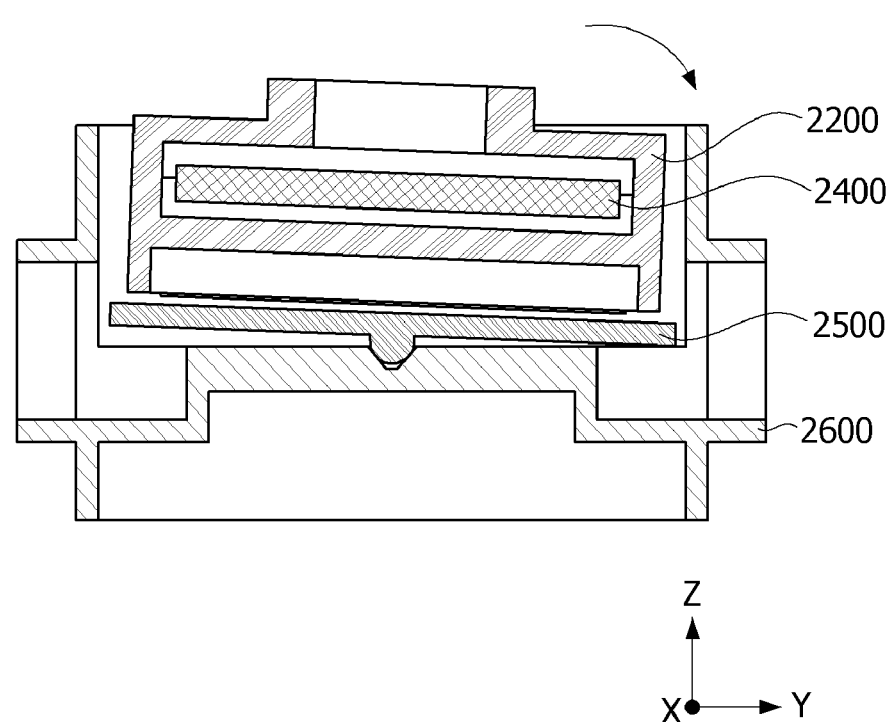
Figure 14B:
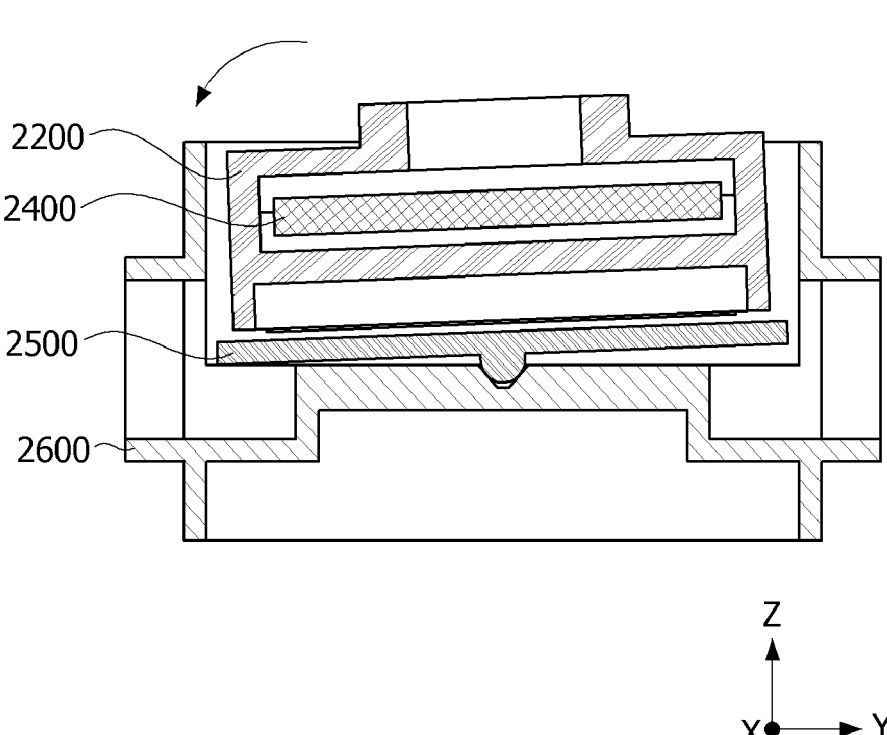

FIGS. 14A and 14B are views for describing a rotating process of the support member according to the embodiment of the present invention.

Figure 15:
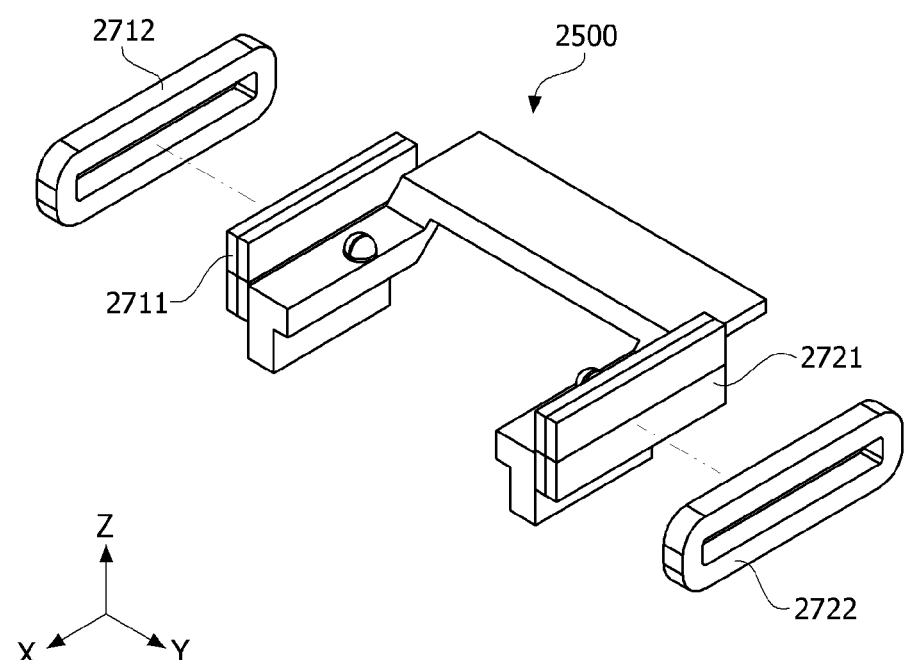

FIG. 15 is a view for describing the arrangement of a first driving unit according to the embodiment of the present invention.

Figure 16:
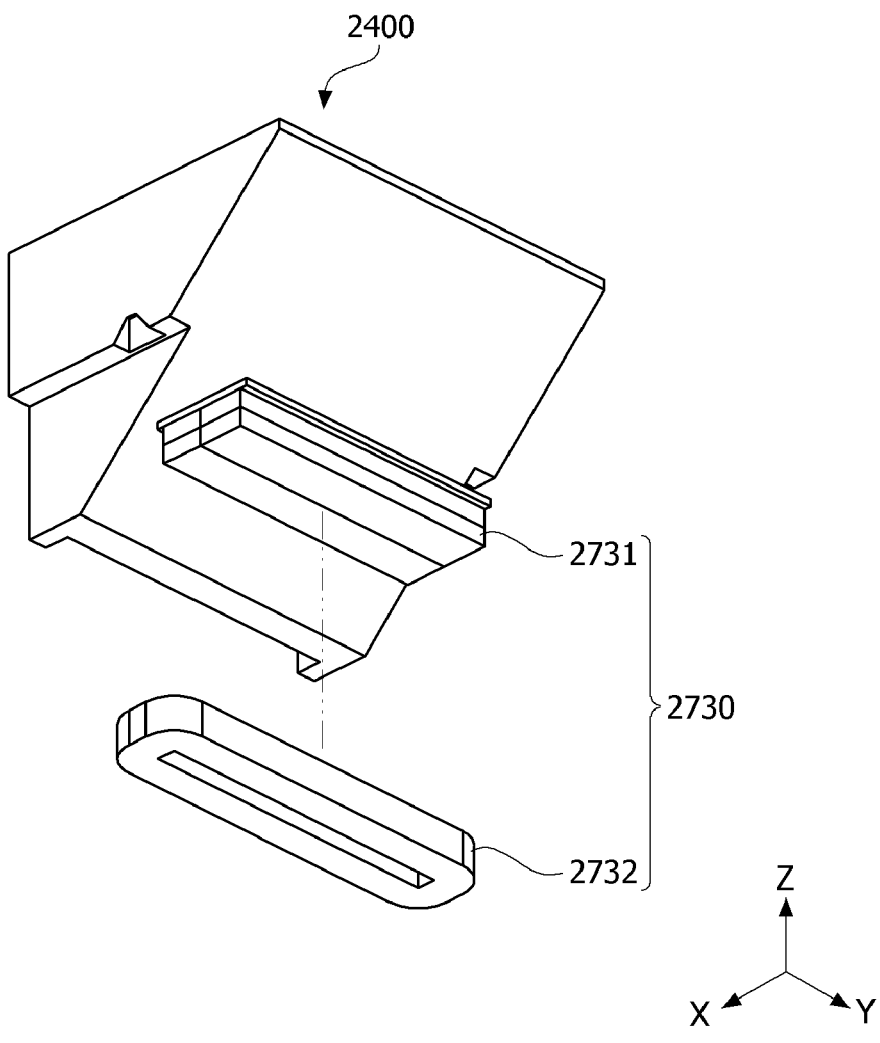

FIG. 16 is a view for describing the arrangement of a second driving unit according to the embodiment of the present invention.

Figure 17:
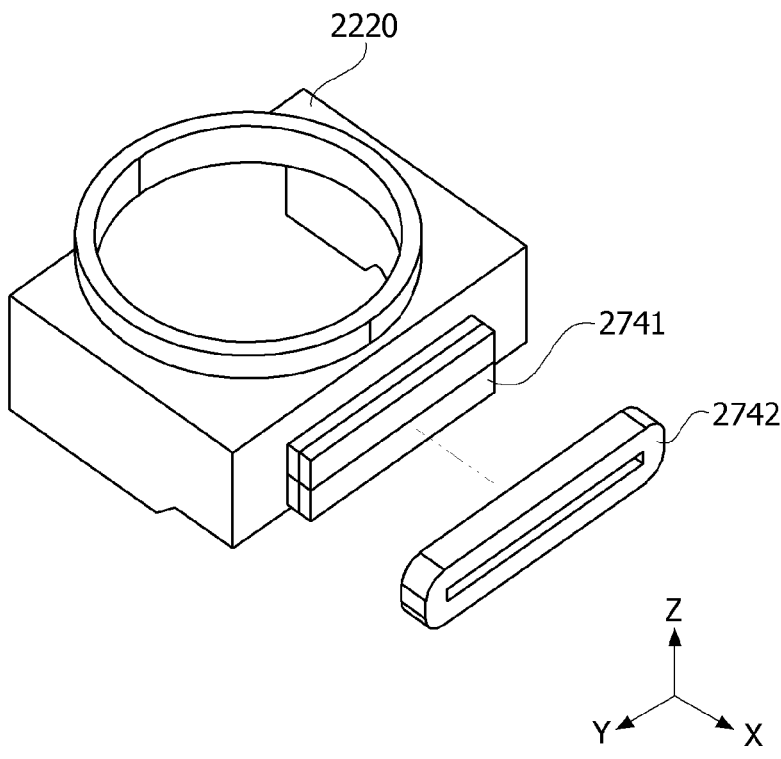

FIG. 17 is a view for describing the arrangement of a third driving unit according to the embodiment of the present invention.

Figure 18:
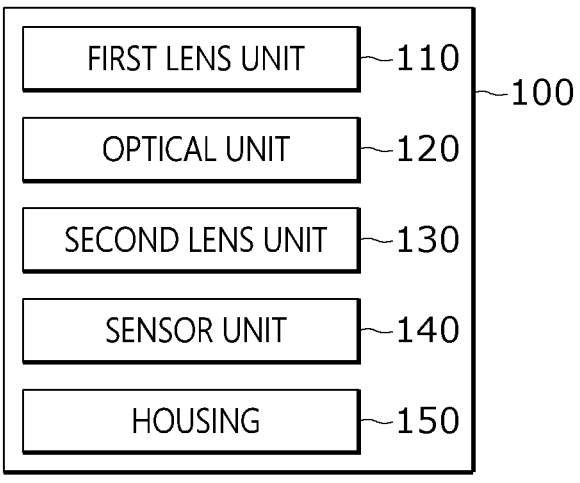

FIG. 18 is a configuration diagram of a camera module according to an embodiment of the present invention.

Figure 19:
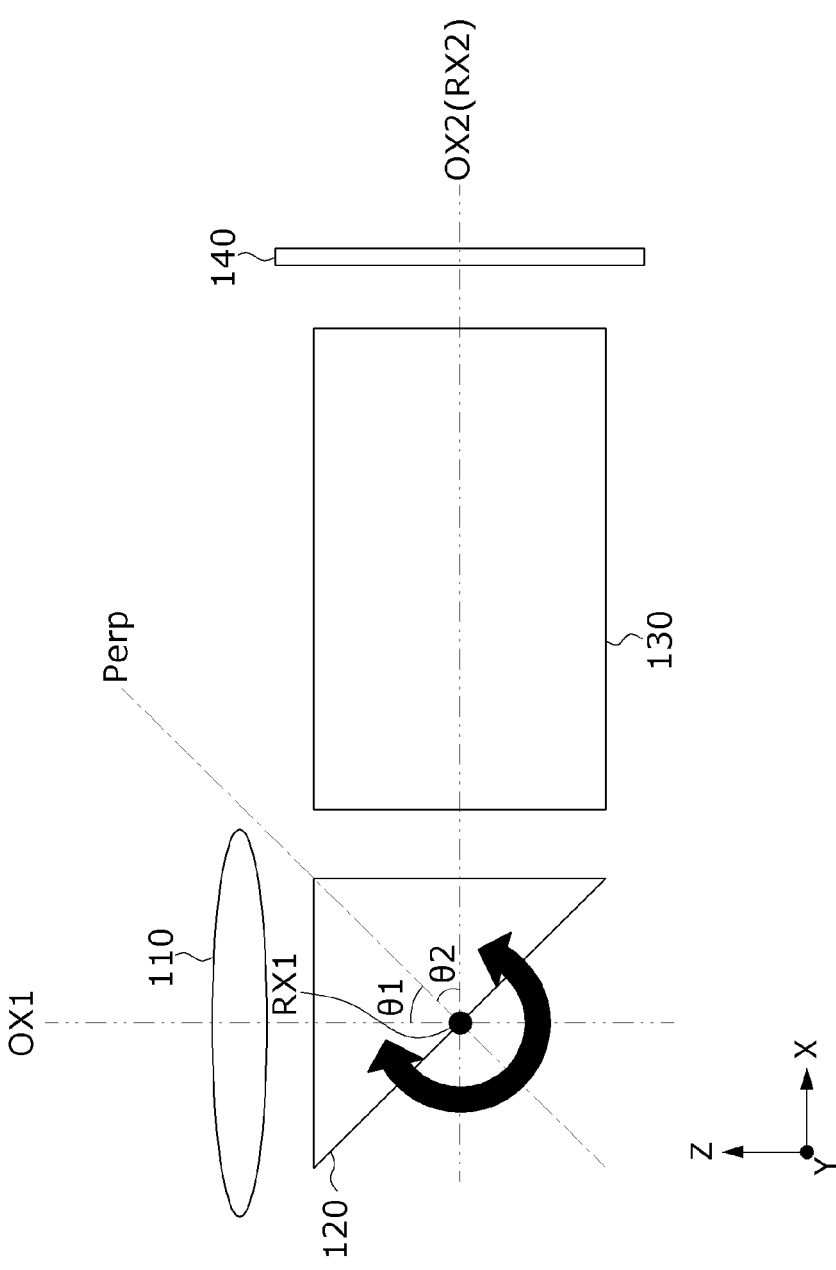
Figure 20:
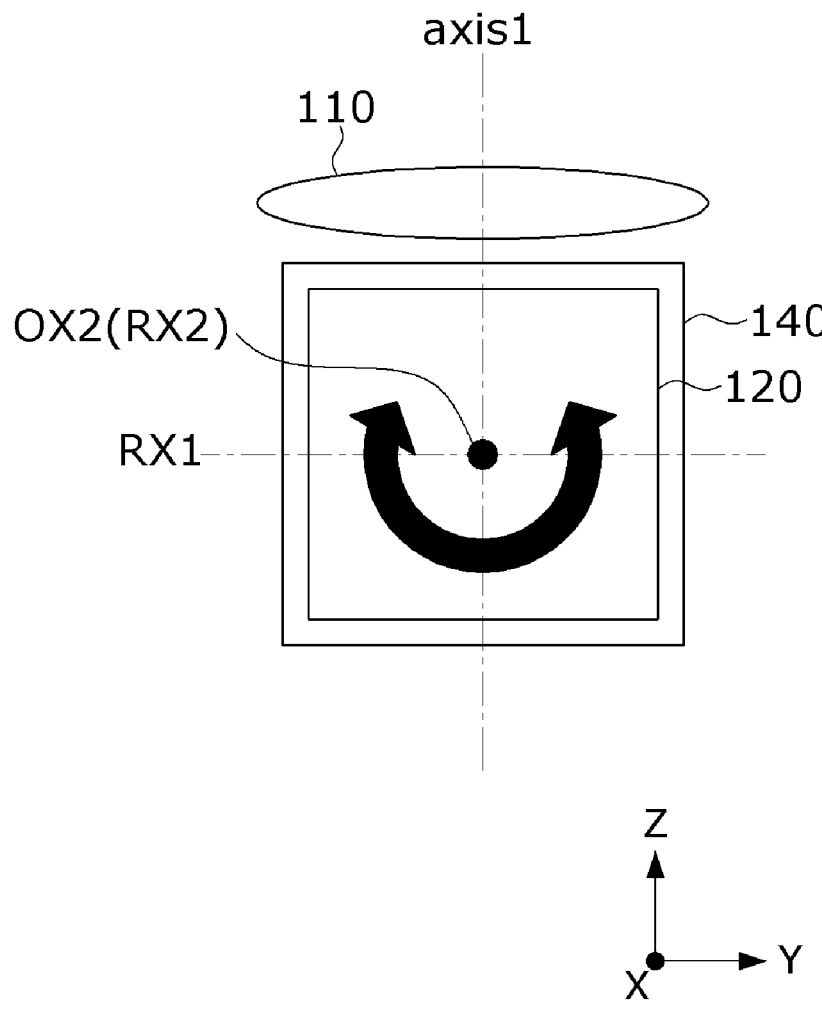

FIGS. 19 and 20 are views of some components of the camera module according to the embodiment of the present invention viewed from one side.

Figure 21:
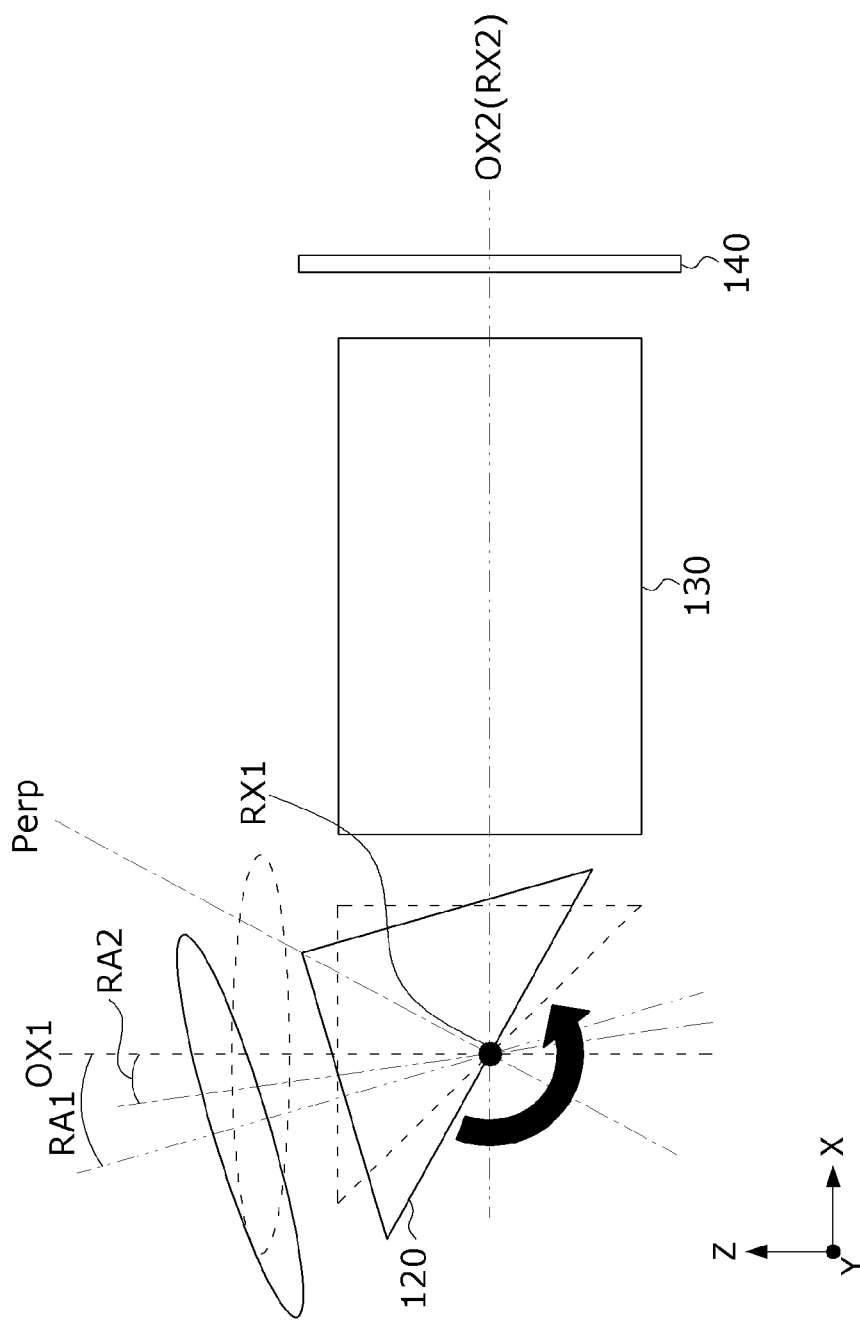
Figure 22:
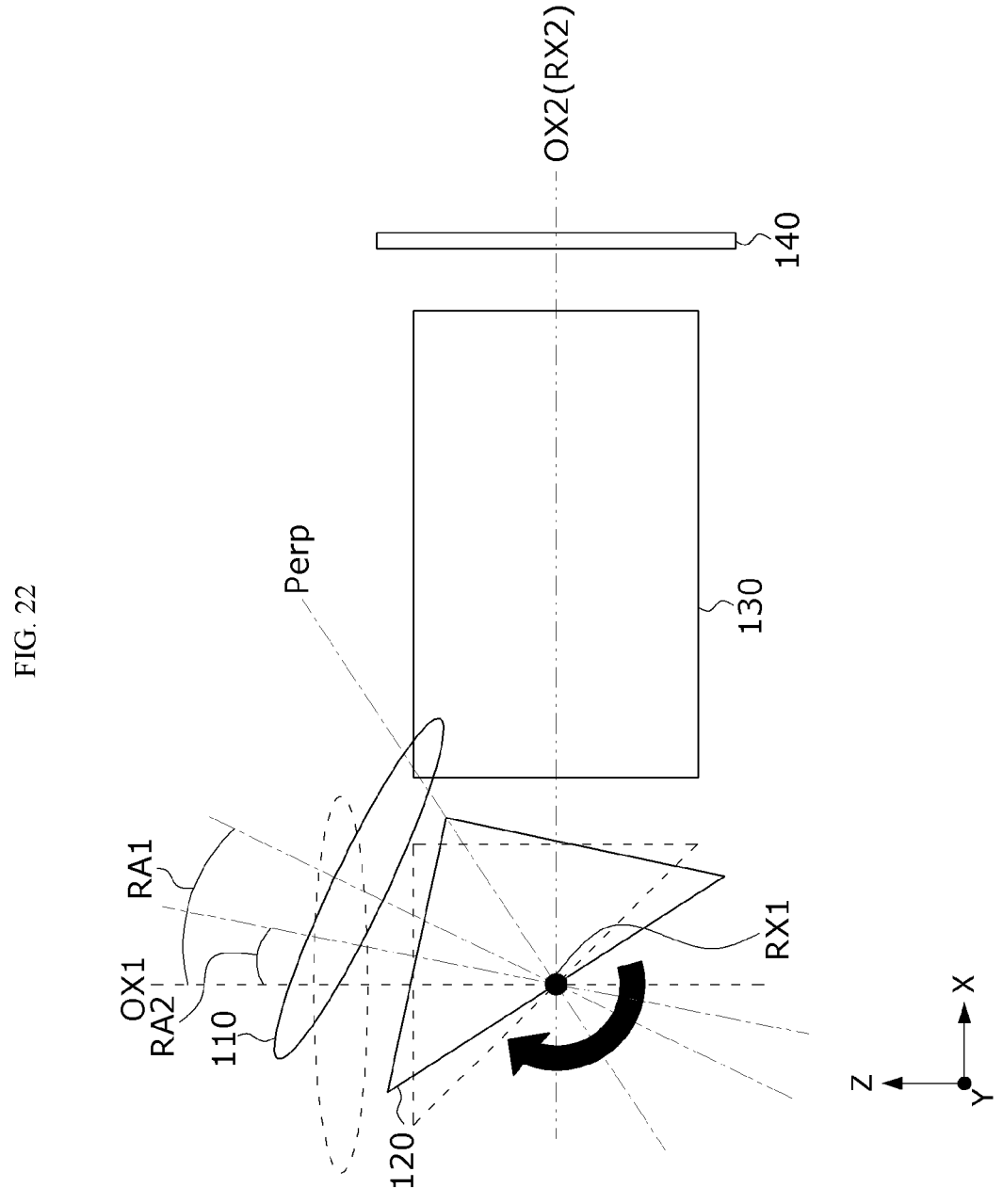

FIGS. 21 and 22 are views for describing rotation mechanism of a first lens unit and an optical unit according to a first embodiment of the present invention.

Figure 23:
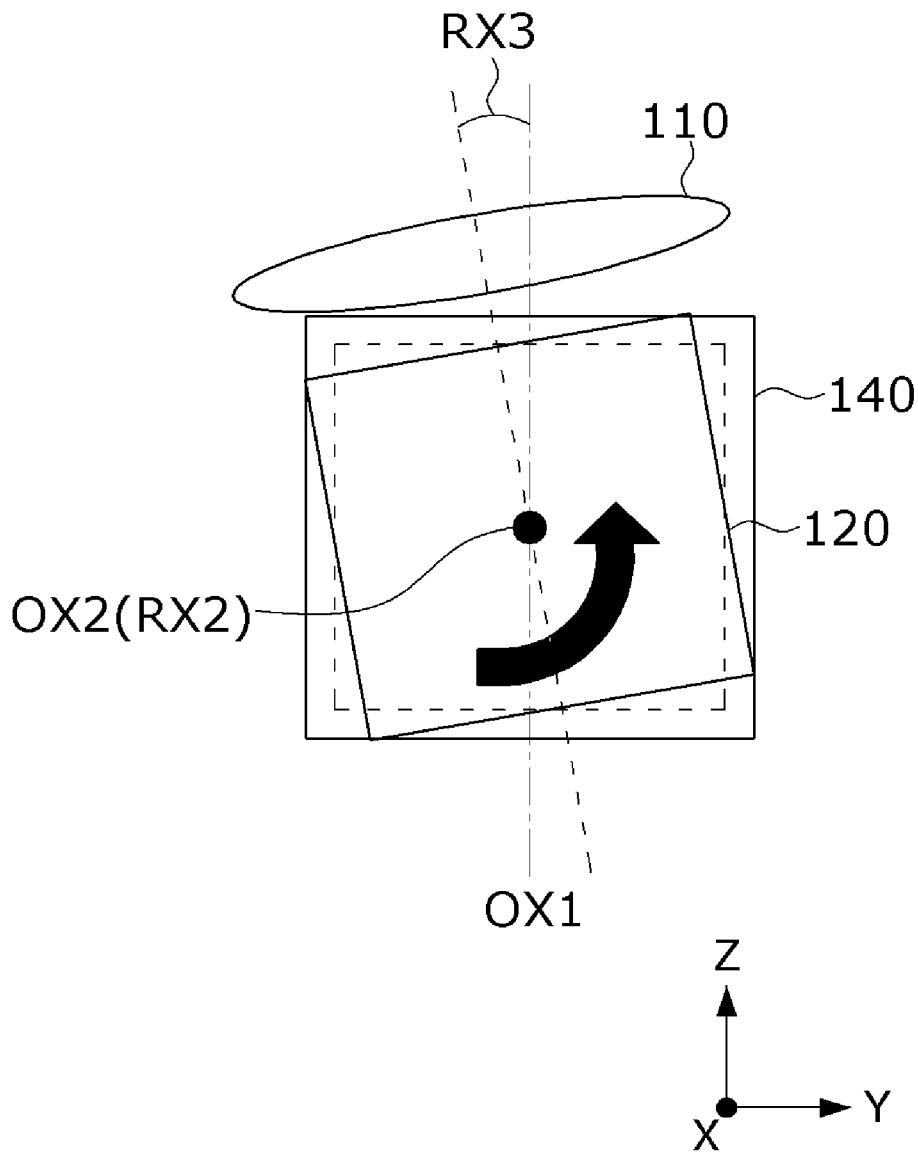
Figure 24:
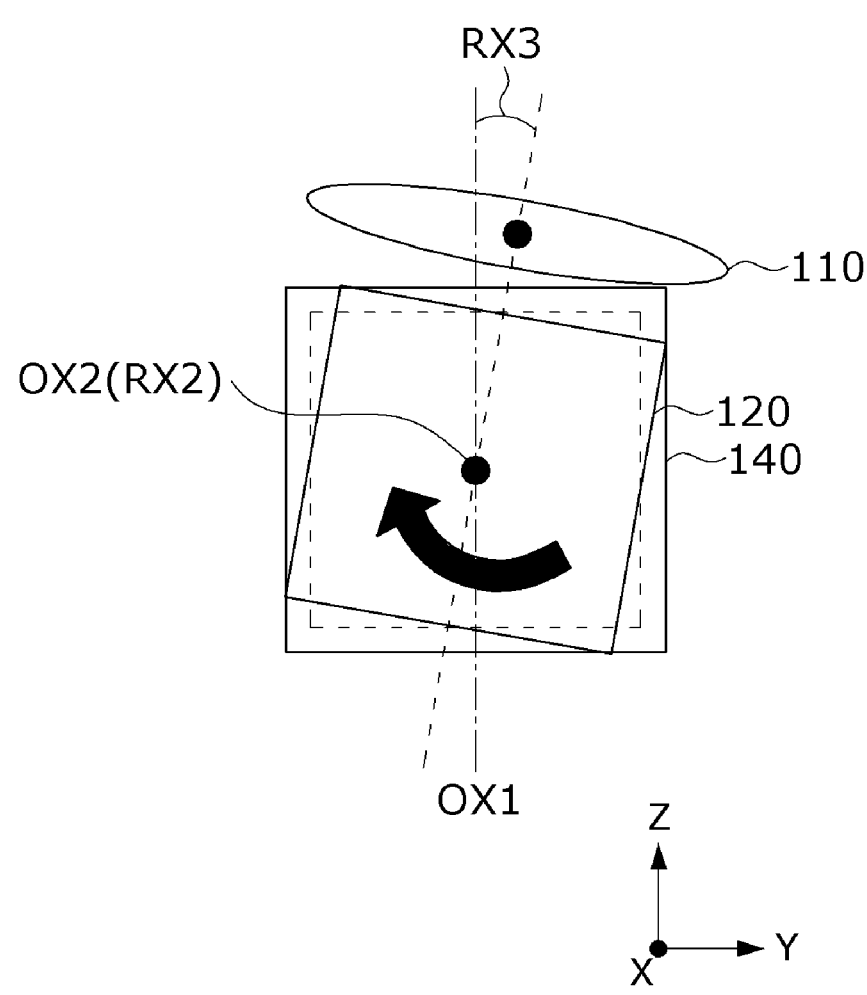

FIGS. 23 and 24 are views for describing a rotational structure of a first lens unit and an optical unit according to a second embodiment of the present invention.

Figure 25:
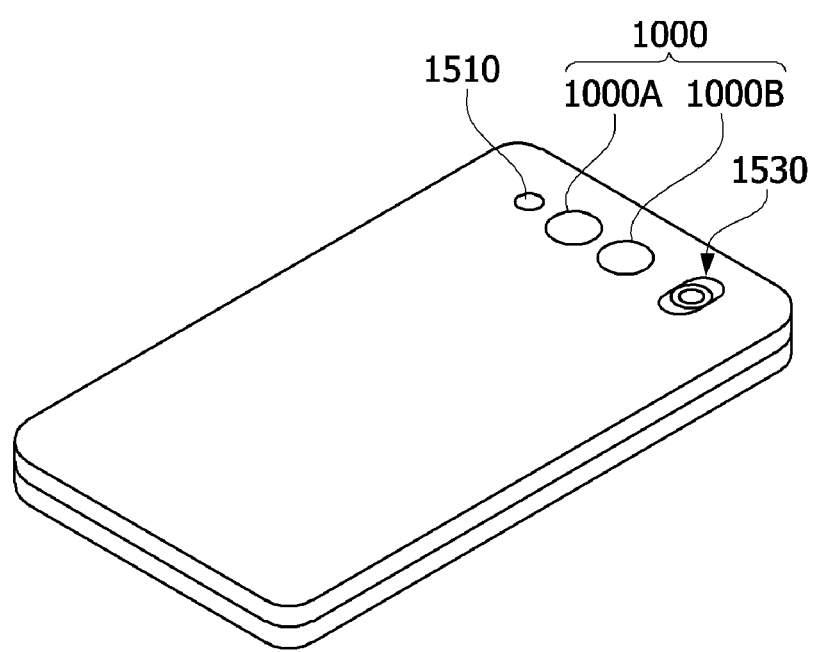

FIG. 25 is a perspective view of a mobile terminal to which the camera device according to the embodiment of the present invention is applied.

Figure 26:
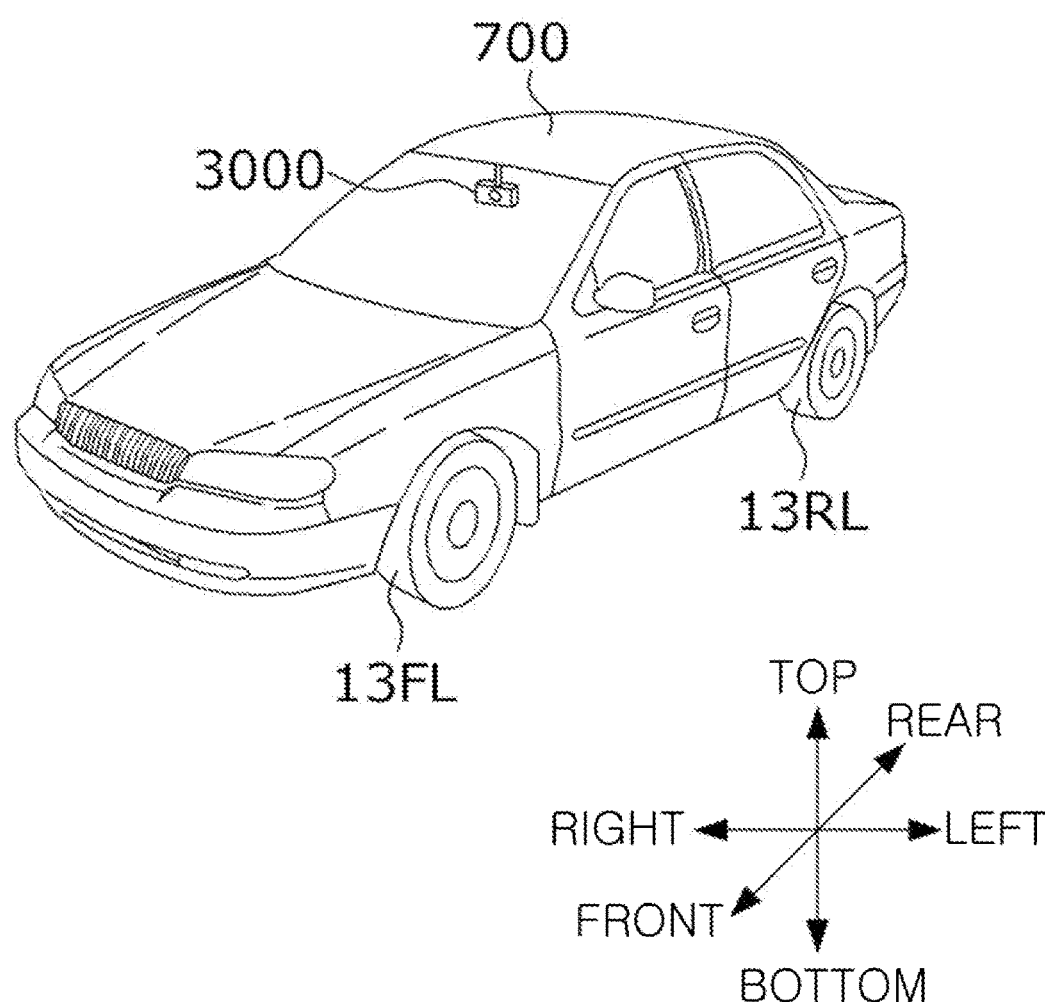

FIG. 26 is a perspective view of a vehicle to which the camera device according to the embodiment of the present invention is applied.

MODES OF THE INVENTION

Hereinafter, exemplary embodiments according to the present invention will be described in detail with reference to the accompanying drawings.

However, the technical spirit of the present invention is not limited to some of the described embodiments, but may be implemented in various different forms, and one or more of the components among the embodiments may be used by being selectively coupled or substituted without departing from the scope of the technical spirit of the present invention.

In addition, terms (including technical and scientific terms) used in embodiments of the present invention may be construed as meaning that may be generally understood by those skilled in the art to which the present invention pertains unless explicitly specifically defined and described, and the meanings of the commonly used terms, such as terms defined in a dictionary, may be construed in consideration of contextual meanings of related technologies.

In addition, the terms used in the embodiments of the present invention are for describing the embodiments and are not intended to limit the present invention.

In the specification, a singular form may include a plural form unless otherwise specified in the phrase, and when described as "at least one (or one or more) of A, B, and C," one or more among all possible combinations of A, B, and C may be included.

In addition, terms such as first, second, A, B, (a), and (b) may be used to describe components of the embodiments of the present disclosure.

The terms are only for the purpose of distinguishing one component from another component, and the nature, sequence, order, or the like of the corresponding components is not limited by these terms.

In addition, when a first component is described as being "connected," "coupled," or "joined" to a second component, it may include a case in which the first component is directly connected, coupled, or joined to the second component, but also a case in which the first component is "connected," "coupled," or "joined" to the second component by other components present between the first component and the second component.

In addition, when a certain component is described as being formed or disposed on "on (above)" or "below (under)" another component, the terms "on (above)" or "below (under)" may include not only a case in which two components are in direct contact with each other, but also a case in which one or more other components are formed or disposed between the two components. In addition, when described as "on (above) or below (under)," it may include the meaning of not only an upward direction but also a downward direction based on one component.

Figure 1:
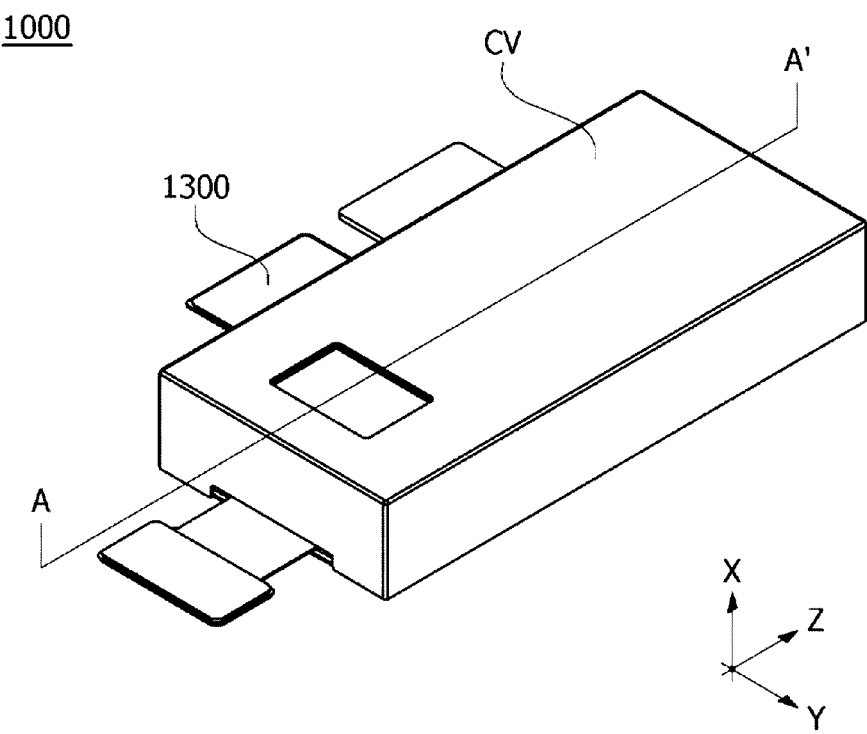
FIG. 1 is a perspective view of a camera device according to an embodiment of the present invention.
Figure 2:
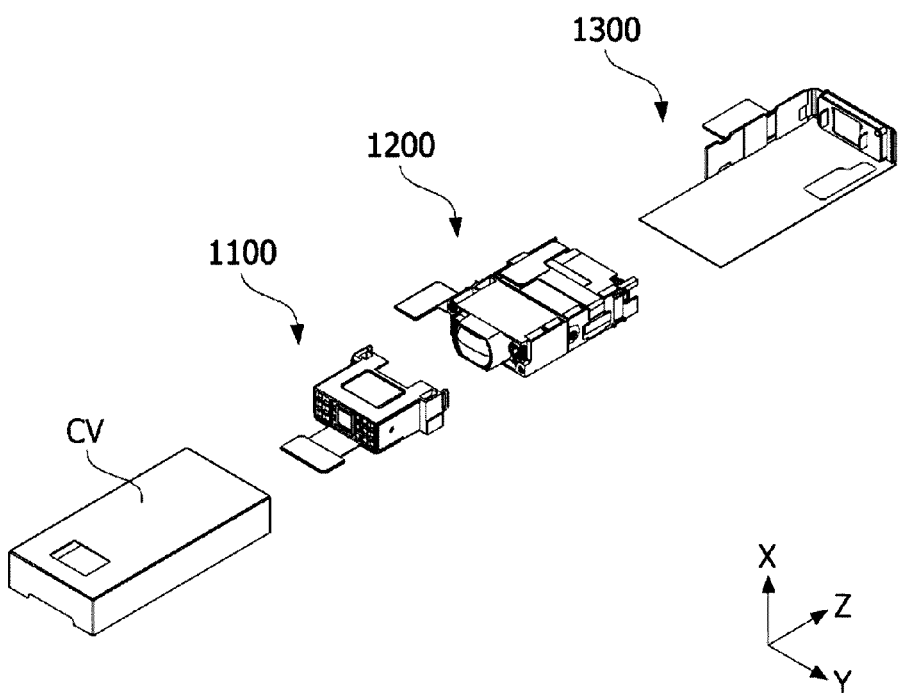
FIG. 2 is an exploded perspective view of the camera device according to the embodiment of the present invention.
Figure 3:
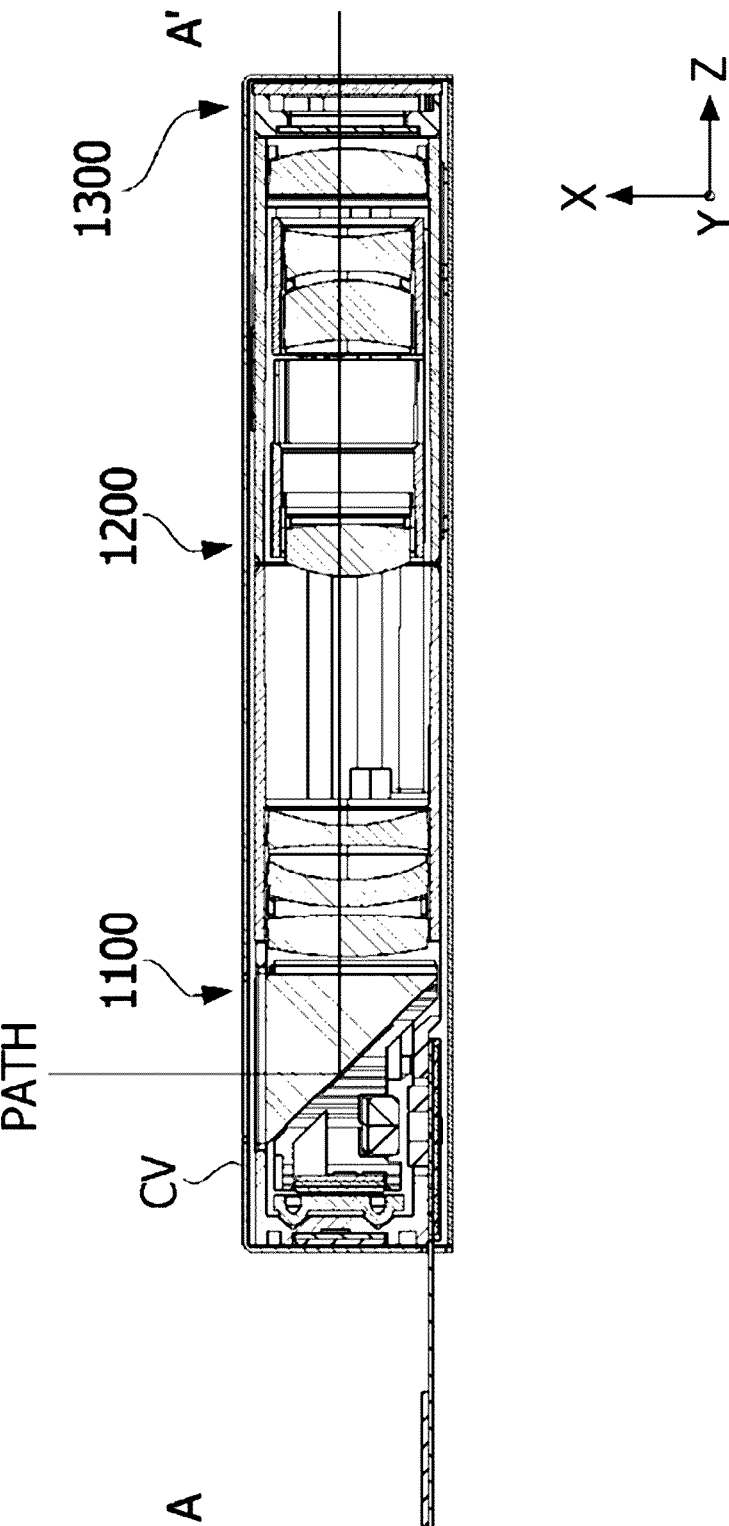
FIG. 3 is a cross-sectional view along line A-A' in FIG. 1.

FIG. 1 is a perspective view of a camera device according to an embodiment of the present invention, FIG. 2 is an exploded perspective view of the camera device according to the embodiment of the present invention, and FIG. 3 is a cross-sectional view along line A-A' in FIG. 1.

Referring to FIGS. 1 and 2, a camera device 1000 according to the embodiment of the present invention may include a cover CV, a first lens driving device 1100, a second lens driving device 1200, and a circuit board 1300. Here, the first lens driving device 1100 may be used interchangeably with "first actuator" and "first camera actuator," and the second lens driving device 1200 may be used interchangeably with "second actuator" and "second camera actuator."

The cover CV may cover the first lens driving device 1100 and/or the second lens driving device 1200. It is possible to increase a coupling strength between the first lens driving device 1100 and the second lens driving device 1200 by the cover CV.

Furthermore, the cover CV may be made of a material that blocks electromagnetic waves. Therefore, it is possible to easily protect the first lens driving device 1100 and the second lens driving device 1200 in the cover CV.

In addition, the first lens driving device 1100 may be an optical image stabilizer (OIS) actuator.

According to the embodiment, the first lens driving device 1100 may change an optical path. According to the embodiment, the first lens driving device 1100 may vertically change the optical path through an internal optical path changing member (e.g., a prism or mirror). With this configuration, even when a thickness of a mobile terminal decreases, a configuration of a lens that is larger than the thickness of the mobile terminal is disposed in the mobile terminal so that zooming, auto focusing (AF), and OIS functions may be performed through the change in the optical path.

The first lens driving device 1100 may change the optical path from a first direction to a third direction. Here, the first direction is a Z-axis direction and is a direction in which light is incident on the first camera actuator 1100, and the third direction is an X-axis direction and may correspond to a direction in which light provided to an image sensor proceeds.

Additionally, the first lens driving device 1100 may include a fixed focal length lens disposed in a predetermined barrel (not illustrated). The fixed focal length lens may be referred to as "single focal length lens" or "single lens."

The second lens driving device 1200 may be disposed at a rear end of the first lens driving device 1100. The second lens driving device 1200 may be disposed at an image side of the first lens driving device 1100. The second lens driving device 1200 may be coupled to the first lens driving device 1100. In addition, the mutual coupling may be performed in any of various methods.

In addition, the second lens driving device 1200 may be a zoom actuator or AF actuator. For example, the second lens driving device 1200 may support one lens or a plurality of lenses and perform an AF function or zooming function by moving the lenses according to a predetermined control signal of a control unit.

The circuit board 1300 may be disposed at a rear end of the second lens driving device 1200. The circuit board 1300 may be electrically connected to the second lens driving device 1200 and the first lens driving device 1100. In addition, a plurality of circuit boards 1300 may be provided.

The circuit board 1300 may be connected to a housing of the second lens driving device 1200 and may be provided with an image sensor. Furthermore, a base unit including a filter may be seated on the circuit board 1300.

The camera device according to the embodiment may be formed of one camera device or a plurality of camera devices. For example, the plurality of camera devices may include a first camera device and a second camera device. In addition, as described above, the camera device may be used interchangeably with "camera module," "camera device," "imaging device," "imaging module," "imaging machine," or the like.

In addition, the first camera device may include one lens driving device or a plurality of lens driving devices. For example, the first camera device may include the first lens driving device 1100 and the second lens driving device 1200.

In addition, the second camera device may include a lens driving device (not illustrated) disposed in a predetermined housing (not illustrated) and capable of driving a lens unit. Although the lens driving device may include a voice coil motor, a micro actuator, a silicone actuator, or the like and applied in various methods such as an electrostatic method, a thermal method, a bimorph method, and an electrostatic force method, the present invention is not limited thereto. In addition, in the specification, the lens driving device may be referred to as "actuator" or the like. In addition, the camera device formed of the plurality of camera devices may be mounted in various electronic devices such as a mobile terminal.

Referring to FIG. 3, the camera device according to the embodiment of the present invention may include the first lens driving device 1100 for performing the OIS function and the second lens driving device 1200 for performing the zooming function and the AF function.

Light may be incident on the camera device through an upper surface of the first lens driving device 1100. In other words, the light may be incident on the first lens driving device 1100 in an optical axis direction (e.g., an X-axis direction), and the optical path may be changed in a vertical direction (e.g., a Z-axis direction) through the optical member. In addition, the light may pass through the second lens driving device 1200 and may be incident on an image sensor IS positioned at one end of the second lens driving device 1200 (PATH).

In addition, with this configuration, the camera device according to the embodiment may resolve the spatial limitations of the first lens driving device 1100 and the second lens driving device 1200 by changing the optical path. In other words, the camera device according to the embodiment may extend the optical path while minimizing the thickness of the camera device in response to the change in the optical path. Furthermore, it should be understood that the second lens driving device 1200 may provide a high range of magnification by controlling a focus or the like in the extended optical path.

In addition, the camera device according to the embodiment can implement an OIS by controlling the optical path through the first lens driving device 1100, thereby minimizing the occurrence of a decentering or tilting phenomenon and providing the best optical characteristics.

Furthermore, the second lens driving device 1200 may include an optical system and a lens driving unit. For example, at least one of a first lens assembly, a second lens assembly, a third lens assembly, and a guide pin may be disposed in the second lens driving device 1200.

In addition, the second lens driving device 1200 may include a coil and a magnet and perform a high-magnification zooming function.

For example, although the first lens assembly and the second lens assembly may be moving lenses that move through the coil, the magnet, and the guide pin and the third lens assembly may be a fixed lens, the present invention is not limited thereto. For example, the third lens assembly may perform a function of a focator by which light forms an image at a specific position, and the first lens assembly may perform a function of a variator for re-forming an image formed by the third lens assembly, which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator.

For example, the second lens assembly may perform a function of a compensator for accurately forming an image at an actual position of the image sensor using the imaging points of the image formed by the first lens assembly which is the variator. For example, the first lens assembly and the second lens assembly may be driven by an electromagnetic force generated by the interaction between the coil and the magnet. The above description may be applied to a lens assembly to be described below.

Meanwhile, when the OIS actuator and the AF or zoom actuator are disposed according to the embodiment of the present invention, it is possible to prevent the magnetic field interference with an AF or zooming magnet when an OIS is driven. For example, since a driving magnet of the first lens driving device 1100 is disposed separately from the second lens driving device 1200, it is possible to prevent magnetic field interference between the first lens driving device 1100 and the second lens driving device 1200. In the specification, an OIS may be used interchangeably with terms such as hand shaking correction, optical image stabilization, optical image correction, or shaking correction.

Figure 4:
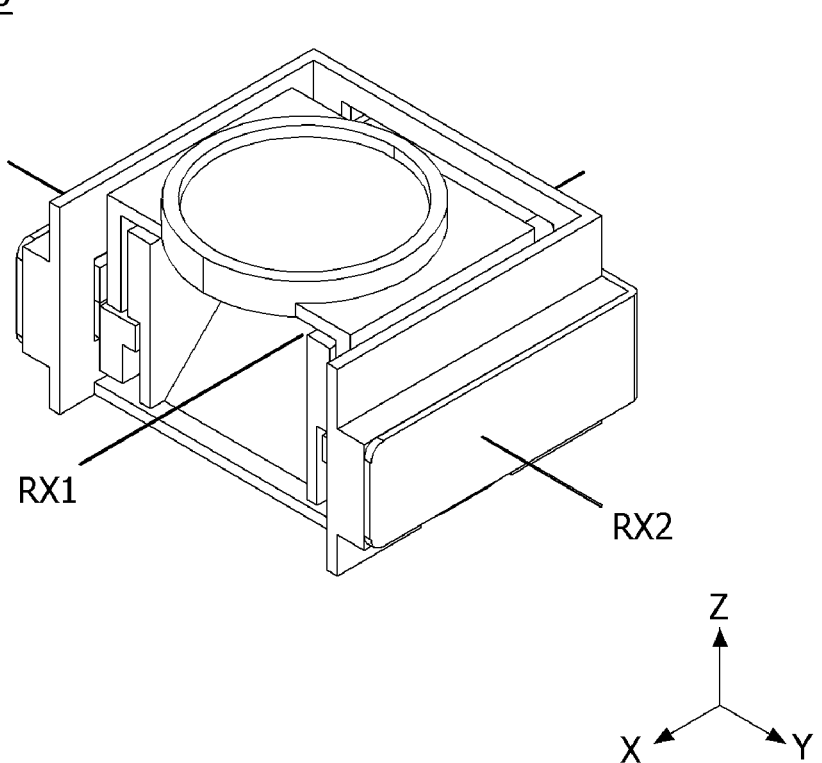
FIG. 4 is a perspective view of a lens driving device according to the embodiment of the present invention.
Figure 5:
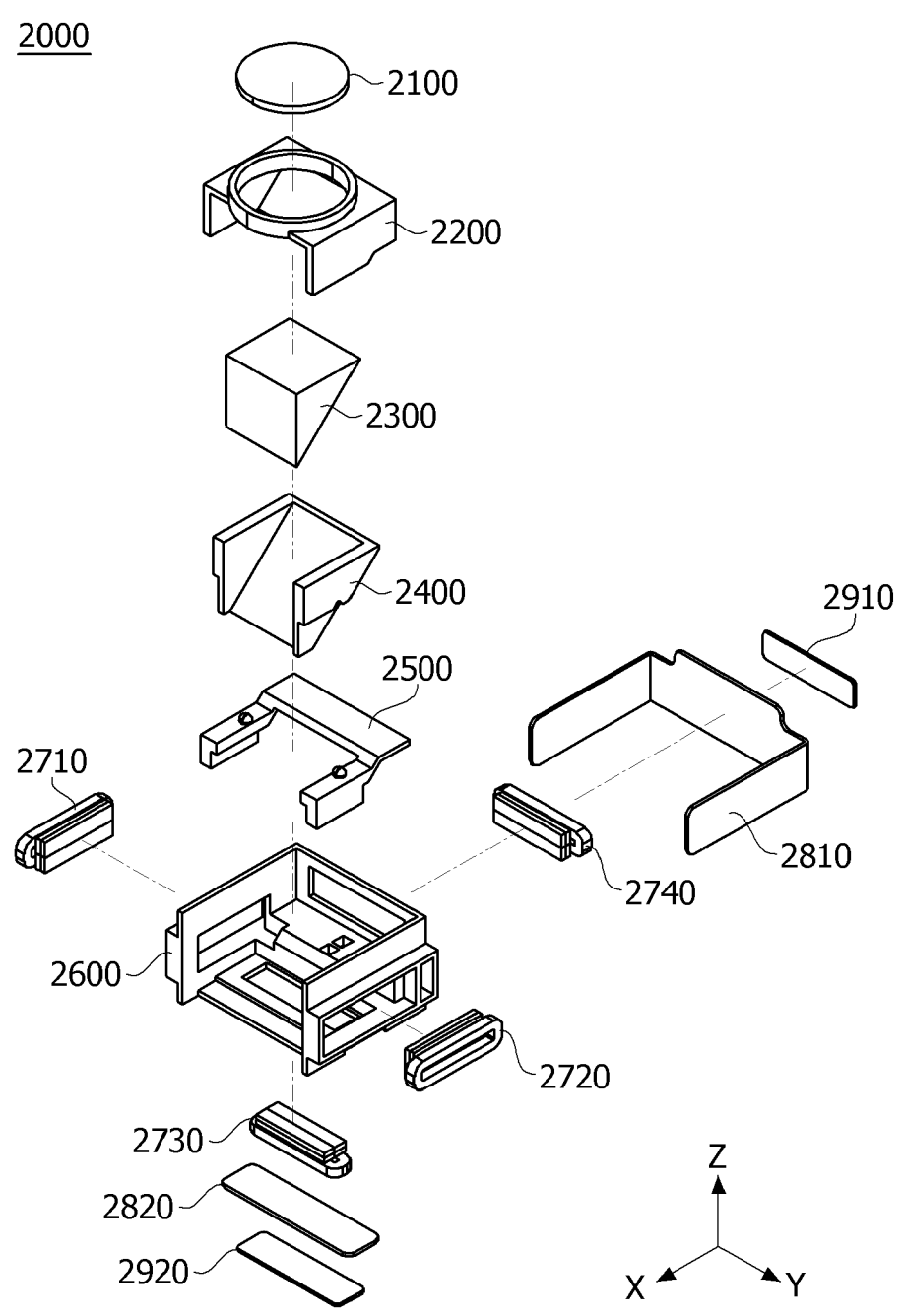
FIG. 5 is an exploded perspective view of the lens driving device according to the embodiment of the present invention.

FIG. 4 is a perspective view of the lens driving device according to the embodiment of the present invention. FIG. 5 is an exploded perspective view of the lens driving device according to the embodiment of the present invention.

Referring to FIGS. 4 and 5, a lens driving device 2000 according to an embodiment of the present invention includes a first lens 2100, a lens holder 2200, an optical path changing member 2300, an optical path changing member holder 2400, a support member 2500, a frame 2600, a driving unit 2700, a board 2800, and a yoke 2900.

The first lens 2100 may receive light. The first lens 2100 may receive light incident from a subject. The first lens 2100 may include at least one light receiving lens. The first lens 2100 may condense light. The first lens 2100 may condense light incident from the subject. The first lens 2100 may include at least one light condensing lens.

The first lens 2100 may have positive (+) power. When the first lens 2100 is formed of a lens group including a plurality of lenses, the entirety of the lens group may have the positive (+) power. When the first lens 2100 is formed of one lens, the one lens may have the positive (+) power.

The first lens 2100 may include at least one lens having a thickness of an edge portion of an effective diameter smaller than a thickness of a central portion of the effective diameter. When the first lens 2100 is formed of a lens group including a plurality of lenses, at least one of the plurality of lenses may have the thickness of the edge portion of the effective diameter smaller than the thickness of the central portion of the effective diameter. When the first lens 2100 is formed of one lens, the one lens may have the thickness of the edge portion of the effective diameter smaller than the thickness of the central portion of the effective diameter.

The first lens 2100 may include at least one convex lens. When the first lens 2100 is formed of a lens group including a plurality of lenses, at least one of the plurality of lenses may be a convex lens. When the first lens 2100 is formed of one lens, the one lens may be a convex lens.

By constituting the first lens 2100 as described above, the camera module according to the embodiment of the present invention can increase the amount of received light by increasing an F number (Fno).

The first lens 2100 may move to implement the OIS function of the camera module. According to one embodiment, the first lens 2100 may rotate at an arbitrary angle about an arbitrary axis. The path of incident light may be changed by rotating the first lens 2100 at the arbitrary angle about the arbitrary axis.

The lens holder 2200 may include the first lens 2100. The first lens 2100 may be disposed on one surface of the lens holder 2200. According to the embodiment, an opening may be formed in an upper surface of the lens holder 2200, and the first lens 2100 may be coupled to the opening formed in the upper surface.

The lens holder 2200 may independently rotate about each of a plurality of axes. The lens holder 2200 may rotate about a first axis RX1 and/or a second axis RX2. As the lens holder 2200 rotates about the first axis RX1 and/or the second axis RX2, the coupled first lens 2100 also rotates or tilts about the first axis RX1 and/or the second axis RX2. Therefore, as the lens holder 2200 rotates about the first axis RX1 and/or the second axis RX2, the optical path of the light passing through the first lens 2100 may be changed.

The driving unit 2700 may be coupled to one side of the lens holder 2200 to provide a driving force for rotation about the first axis RX1 and/or the second axis RX2. According to one embodiment, a third driving unit 2740 for providing a driving force for rotation about the second axis RX2 may be coupled to one side surface of the lens holder 2200.

The optical path changing member 2300 may be disposed inside the lens driving device 2000. The optical path changing member 2300 may be disposed at an image side of the first lens 2100. The optical path-changing member 2300 may be disposed at the image side of the first lens 2100 and may change the path of the light received through the first lens 2100 and output the light. The optical path changing member 2300 may reflect the light incident from the first lens 2100 and output the light.

According to one embodiment, the optical path changing member 2300 may be configured as a prism. The prism has a first surface (incident surface) on which light is incident from the first lens 2100, a second surface (reflective surface) from which the light incident through the first surface (incident surface) is reflected, and a third surface (emitting surface) through which the light reflected by the second surface (reflecting surface) is output. According to one embodiment, the optical path changing member 2300 may be configured as a mirror. The mirror may include a reflective surface that reflects the light input from the first lens 2100. As described above, the optical path changing member 2300 may reflect the light incident from the outside (e.g., an object) to the inside of the camera module. For example, the optical path changing member 2300 may reflect the incident light toward the image sensor. Therefore, it should be understood that the camera module may provide a high range of magnification by extending the optical path while minimizing a thickness thereof.

The optical path changing member holder 2400 may be accommodated in the lens holder 2200. The optical path changing member holder 2400 may be seated on the lens holder 2200.

The optical path changing member holder 2400 may include the optical path changing member 2300. The optical path changing member 2300 may be disposed on the optical path changing member holder 2400. The optical path changing member holder 2400 may be formed with an accommodating space capable of accommodating the optical path changing member 2300. A seating surface on which the reflective surface of the optical path changing member 2300 may be seated may be formed in the accommodating space of the optical path changing member holder 2400. An upper surface and one side surface of the accommodating space of the optical path changing member holder 2400 may be open, a direction toward the open upper surface may be a direction in which light is incident from the first lens 2100, and a direction toward the open one side surface may be a direction in which light is emitted.

The optical path changing member holder 2400 may independently rotate about a plurality of axes. The optical path changing member holder 2400 may rotate about each of the first axis RX1 and/or the second axis RX2. As the optical path changing member holder 2400 rotates about the first axis RX1 and/or the second axis RX2, the seated optical path changing member may also rotate or tilt about the first axis RX1 and/or the second axis RX2. Therefore, as the optical path changing member holder 2400 rotates about the first axis RX1 and/or the second axis RX2, the optical path of the light reflected by the optical path changing member may be changed.

The driving unit 2700 may be coupled to one side of the optical path changing member holder 2400 to provide a driving force for rotation about the first axis RX1 and/or the second axis RX2. According to one embodiment, a second driving unit 2730 for providing a driving force for rotation about the second axis RX2 may be coupled to one side surface of the optical path changing member holder 2400.

The support member 2500 may support the lens holder 2200. The lens holder 2200 may be disposed on the support member 2500. The support member 2500 may support the optical path changing member holder 2400. The optical path changing member holder 2400 may be disposed on the support member 2500. The support member 2500 may support the lens holder 2200 and the optical path changing member holder 2400.

The support member 2500 may rotate about an axis. According to one embodiment, the support member 2500 may rotate about the first axis RX1. As the support member 2500 rotates about the first axis RX1, the lens holder 2200 and the optical path changing member holder 2400 supported by the support member 2500 also rotate about the first axis RX1. In addition, as the support member 2500 rotates about the first axis RX1, the first lens 2100 disposed on the lens holder 2200 and the optical path changing member disposed on the optical path changing member holder 2400 may also tilt about the first axis RX1. Therefore, as the support member 2500 rotates about the first axis RX1, the optical path of the light reflected by the first lens 2100 and the optical path changing member 2300 may change.

The driving unit 2700 may be coupled to at least one side of the support member 2500 to provide a driving force for rotation about an axis. According to one embodiment, first driving units 2710 and 2720 may be coupled to at least one side of the support member to provide a driving force for rotation about the first axis RX1.

The frame 2600 may support the support member 2500. The support member 2500 may be disposed on the frame 2600. The frame 2600 may support the support member 2500 so that the support member 2500 may rotate about the first axis RX1. The support member 2500 may be disposed on the frame 2600 to rotate about the first axis RX1.

The driving unit 2700 may be configured as a plurality of driving units to provide a driving force. The at least one 2740 of the plurality of driving units may provide a driving force to the lens holder 2200. The at least one 2740 of the plurality of driving units may provide a driving force so that the lens holder 2200 rotates about the second axis RX2. The at least one 2730 of the plurality of driving units may provide a driving force to the optical path changing member holder 2400. The at least one 2730 of the plurality of driving units may provide a driving force so that the optical path changing member holder 2400 rotates about the second axis RX2. The at least one driving unit 2710 of the plurality of driving units may provide a driving force to the support member 2500. The at least one driving unit 2710 of the plurality of driving units may provide a driving force so that the support member 2500 rotates about the first axis RX1.

The driving unit 2700 may be implemented as various devices capable of providing a driving force. According to one embodiment, the driving unit 2700 may be a voice coil motor (VCM) including at least one magnet and at least one coil facing the same. In this case, the coil or magnet may be coupled to the lens holder 2200, the optical path changing member holder 2400, and the support member 2500, and the facing magnet or coil may be coupled to a board. According to another embodiment, the driving unit 2700 may be implemented as a device capable of providing a driving force, such as an encoder device or piezo device.

The driving unit 2700 may be disposed on the board 2800. According to the embodiment, a magnet or coil, which faces the coil or magnet coupled to the lens holder 2200, the optical path changing member holder 2400, and the support member 2500, may be disposed on the board 2800.

A plurality of boards 2800 may be provided. According to the embodiment, the board may include a first board 2810 and a second board 2820. The magnet or coil, which faces the coil or magnet coupled to the lens holder 2200, the optical path changing member holder 2400, and the support member 2500 may be disposed on the first board 2810 and the second board 2820. For example, coils included in the first driving units 2710 and 2720 and the third driving unit 2740 among the plurality of driving units may be disposed on the first board 2810, and the disposed coils may be implemented in a predetermined shape to face the corresponding magnets. In addition, the coil included in the second driving unit 2730 among the plurality of driving units may be disposed on the second board 2820, and the disposed coil may be implemented in a predetermined shape to face the corresponding magnet.

The board 2800 may be electrically connected to the outside to supply power to the driving unit 2700. To this end, a circuit capable of supplying power to or controlling power supply to the driving unit 2700 may be disposed on the board 2800. The board 2800 may be a printed circuit board (PCB), but is not limited thereto.

The yoke 2900 may be disposed on the board 2800 to correspond to the driving unit 2700. The yoke 2900 may be disposed on one surface of the board 2800 facing one surface on which the coil of the driving unit 2700 is disposed. The yoke 2900 may be disposed on the board 2800 to correspond to each coil included in the plurality of driving units 2700, but is not limited thereto. The yoke 2900 may be disposed on the board 2800 to correspond to some of the plurality of driving units 2700. For example, the yoke 2900 may include a first yoke 2910 and a second yoke 2920, the second yoke 2920 may be disposed on the second board 2820 to correspond to the coil of the second driving unit 2730 for providing a driving force to the optical path changing member holder 2400, and the first yoke 2910 may be disposed on the first board 2810 to correspond to the coil of the third driving unit 2740 for providing a driving force to the lens holder 2200.

Meanwhile, the first axis RX1 may be formed in the X-axis direction of the lens driving device 2000. In addition, the second axis RX2 may be formed in the Y-axis direction of the lens driving device 2000. The first axis RX1 and the second axis RX2 may intersect each other. The first axis RX1 and the second axis RX2 may intersect each other to form an intersection. An intersection where the first axis RX1 and the second axis RX2 intersect may be formed on the reflective surface of the optical path changing member 2300.

As the first axis RX1 and the second axis RX2 intersect each other to form the intersection point and the intersection is formed on the reflective surface of the optical path changing member 2300, path changing optical performance cannot be degraded even when the lens holder 2200 and the optical path changing member holder 2400 rotates about the first axis RX1 and the second axis RX2.

The first axis RX1 and the second axis RX2 may intersect each other to form a predetermined angle. According to one embodiment, the first axis RX1 and the second axis RX2 may perpendicularly intersect each other. The first axis RX1 and the second axis RX2 may intersect each other to form 90 degrees with respect to the intersection.

Figure 6A:
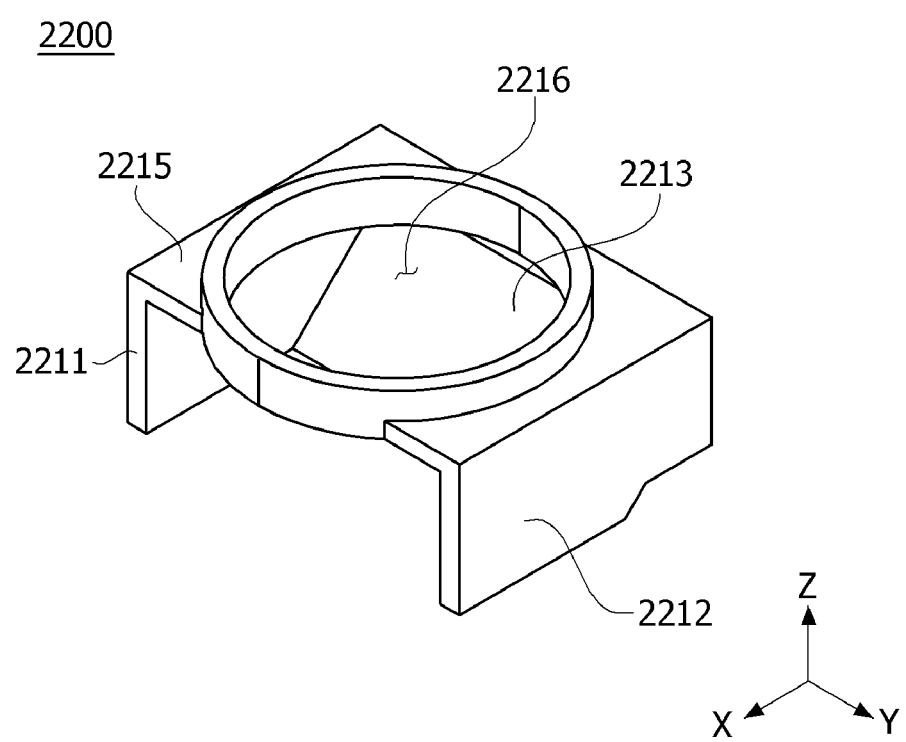
FIG. 6A is a perspective view of a lens holder according to the embodiment of the present invention.
Figure 6B:
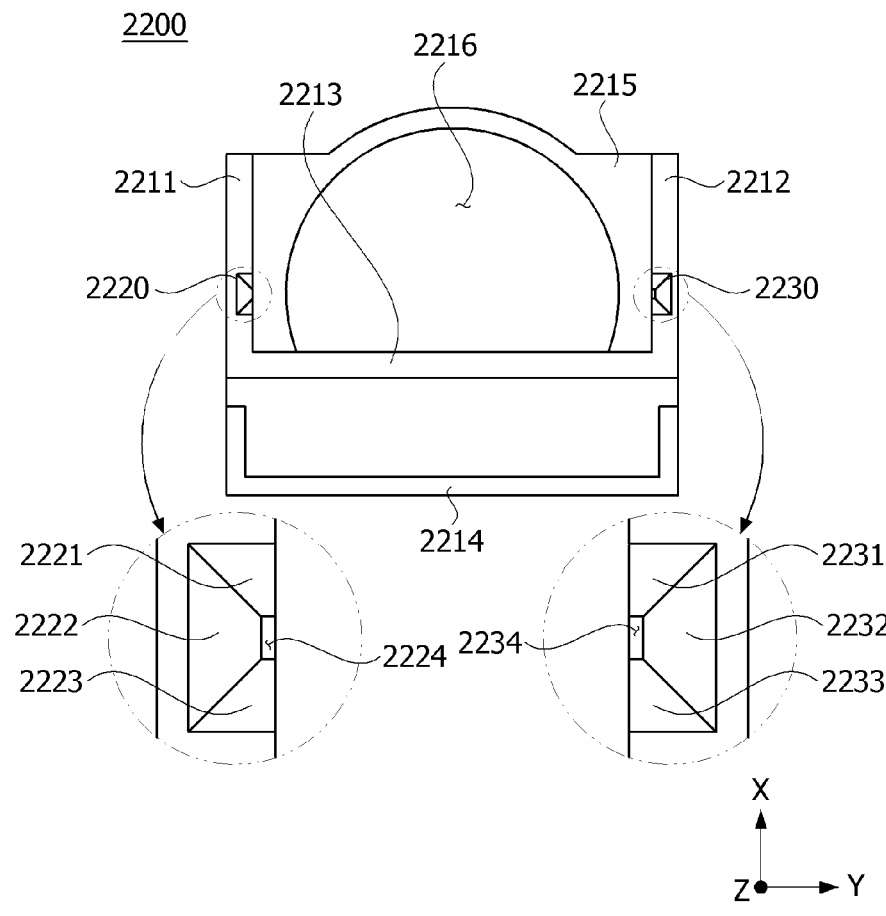
FIG. 6B is a rear view of the lens holder according to the embodiment of the present invention.

FIG. 6A is a perspective view of a lens holder according to the embodiment of the present invention. FIG. 6B is a rear view of the lens holder according to the embodiment of the present invention.

Referring to FIGS. 6A and 6B, the lens holder 2200 may include a first side surface member 2211, a second side surface member 2212, a third side surface member 2213, a fourth side surface member 2214, and an upper member 2215. The lens holder 2200 may include an accommodating space surrounded by the upper member 2215, the first side surface member 2211, the second side surface member 2212, and the third side surface member 2213. The accommodating space may be open in a lower surface and one side surface of the lens holder 2200. The optical path changing member holder 2400 may be disposed in the accommodating space surrounded by the upper member 2215, the first side surface member 2211, the second side surface member 2212, and the third side surface member 2213.

The first side surface member 2211 may be connected to the upper member 2215, the third side surface member 2213, and the fourth side surface member 2214. An accommodating groove 2220 may be formed in a lower side surface of the first side surface member 2211. The accommodating groove 2220 may have a shape that is open toward the lower surface of the lens holder 2200 and the accommodating space of the lens holder 2200. The accommodating groove 2220 disposed in the first side surface member 2211 may have a shape surrounded by a first seating surface 2221, a second seating surface 2222, a third seating surface 2223, and a bottom surface 2224. The first seating surface 2221 may be connected to the second seating surface 2222, and the second seating surface 2222 may be connected to the third seating surface 2223. In addition, the bottom surface 2224 may be connected to the first seating surface 2221, the second seating surface 2222, and the third seating surface 2223. The first seating surface 2221, the second seating surface 2222, and the third seating surface 2223 may have a predetermined inclination in the Z-axis direction. A support portion formed on the support member 2500 may be accommodated in the accommodating groove 2220. When the support portion is accommodated in the accommodating groove 2220, the first seating surface 2221, the second seating surface 2222, and the third seating surface 2223 may come into contact with the support portion.

The second side surface member 2212 may be connected to the upper member 2215, the third side surface member 2213, and the fourth side surface member 2214. An accommodating groove 2230 may be formed in a lower side surface of the second side surface member 2212. The accommodating groove 2230 may have a shape that is open toward the lower surface of the lens holder 2200 and the accommodating space of the lens holder 2200. The accommodating groove 2230 may have a shape surrounded by a first seating surface 2231, a second seating surface 2232, a third seating surface 2233, and a bottom surface 2234. The first seating surface 2231 may be connected to the second seating surface 2232, and the second seating surface 2232 may be connected to the third seating surface 2233. In addition, the bottom surface 2234 may be connected to the first seating surface 2231, the second seating surface 2232, and the third seating surface 2233. The first seating surface 2231, the second seating surface 2232, and the third seating surface 2233 may have a predetermined inclination in the Z-axis direction. A support portion formed on the support member 2500 may be accommodated in the accommodating groove 2230. When the support portion is accommodated in the accommodating groove 2230, the first seating surface 2231, the second seating surface 2232, and the third seating surface 2233 may come into contact with the support portion.

The third side surface member 2213 may be connected to the upper member 2215, the first side surface member 2211, and the second side surface member 2212. The third side surface member 2213 may form a predetermined angle with respect to the Z-axis direction and may be connected to the upper member 2215, the first side surface member 2211, and the second side surface member 2212. In this case, the predetermined angle may be the same as an angle formed by the reflective surface of the optical path changing member with respect to the Z-axis direction.

The fourth side surface member 2214 may be connected to the upper member 2215, the first side surface member 2211, and the second side surface member 2212. The fourth side surface member 2214 may be disposed to be spaced a predetermined distance from the third side surface member 2213 in the X-axis direction. Therefore, the upper member 2215, the first side surface member 2211, the second side surface member 2212, the third side surface member 2213, and the fourth side surface member 2214 may form a predetermined space, and by forming the predetermined space, it is possible to reduce a weight of the lens holder 2200. When the weight of the lens holder 2200 is reduced, it is possible to reduce power consumed upon rotation of the lens holder 2200 and reduce the manufacturing costs.

An opening 2216 may be formed in the upper member 2215. The first lens may be coupled to the opening 2216. A shape of the opening 2216 may be a circular shape, but is not limited thereto. The shape of the opening 2216 may be implemented in various shapes such as a quadrangular shape as well as a circular shape, which may be implemented depending on the shape of the coupled first lens.

FIG. 7A is a perspective view of an optical path changing member holder according to the embodiment of the present invention. FIG. 7B is a rear view of the optical path changing member holder according to the embodiment of the present invention.

Referring to FIGS. 7A and 7B, the optical path changing member holder 2400 may include a first side surface member 2411, a second side surface member 2412, and a third side surface member 2413. The optical path changing member holder 2400 may include an accommodating space 2414 surrounded by the first side surface member 2411, the second side surface member 2412, and the third side surface member 2413 therein. The accommodating space 2414 may be open in an upper surface and one side surface of the optical path changing member holder 2400. The open one side surface may be in a direction that is the same as that of the open one side surface of the accommodating space 2414 of the lens holder. An optical path changing member may be disposed in the accommodating space 2414 surrounded by the first side surface member 2411, the second side surface member 2412, and the third side surface member 2413.

The first side surface member 2411 may be connected to the third side surface member 2413. A stepped portion may be formed on an outer surface of the first side surface member 2411. The stepped portion may be seated on the side surface member of the support member 2500. An accommodating groove 2420 may be formed in the stepped portion of the first side surface member 2411. A support portion formed on the support member 2500 may be accommodated in the accommodating groove 2420. The accommodating groove 2420 may have a shape that is open downward from the optical path changing member holder 2400 and outward from optical path changing member holder 2400. The accommodating groove 2420 may have a shape surrounded by a first seating surface 2421, a second seating surface 2422, a third seating surface 2423, and a bottom surface 2424. The first seating surface 2421 may be connected to the second seating surface 2422, and the second seating surface 2422 may be connected to the third seating surface 2423. In addition, the bottom surface 2424 may be connected to the first seating surface 2421, the second seating surface 2422, and the third seating surface 2423. The first seating surface 2421, the second seating surface 2422, and the third seating surface 2423 may have a predetermined inclination with respect to the Z-axis direction. A support portion formed on the support member 2500 may be accommodated in the accommodating groove 2420. When the support portion is accommodated in the accommodating groove 2420, the first seating surface 2421, the second seating surface 2422, and the third seating surface 2423 may come into contact with the support portion.

The second side surface member 2412 may be connected to the third side surface member 2413. A stepped portion may be formed on an outer surface of the second side surface member 2412. The stepped portion may be seated on the side surface member of the support member 2500. An accommodating groove 2430 may be formed in the stepped portion of the second side surface member 2412. A support portion formed on the support member 2500 may be accommodated in the accommodating groove 2430. The accommodating groove 2430 may have a shape that is open downward from the optical path changing member holder 2400 and outward from optical path changing member holder 2400. The accommodating groove 2430 may have a shape surrounded by a first seating surface 2431, a second seating surface 2432, a third seating surface 2433, and a bottom surface 2434. The first seating surface 2431 may be connected to the second seating surface 2432, and the second seating surface 2432 may be connected to the third seating surface 2433. In addition, the bottom surface 2434 may be connected to the first seating surface 2431, the second seating surface 2432, and the third seating surface 2433. The first seating surface 2431, the second seating surface 2432, and the third seating surface 2433 may have a predetermined inclination with respect to the Z-axis direction. The support portion formed on the support member 2500 may be accommodated in the accommodating groove 2430. When the support portion is accommodated in the accommodating groove 2430, the first seating surface 2431, the second seating surface 2432, and the third seating surface 2433 may come into contact with the support portion.

The third side surface member 2413 may be connected to the first side surface member 2411 and the second side surface member 2412. The third side surface member 2413 may form a predetermined angle with respect to the Z-axis direction and may be connected to the first side surface member 2411 and the second side surface member 2412. In this case, the predetermined angle may be the same as an angle formed by the reflective surface of the optical path changing member with respect to the Z-axis direction.

FIG. 8A is a perspective view of a support member according to the embodiment of the present invention. FIG. 8B is a plan view of the support member according to the embodiment of the present invention. FIG. 8C is a rear view of the support member according to the embodiment of the present invention. FIG. 8D is a front view of the support member according to the embodiment of the present invention. FIG. 8E is a side view of the support member according to the embodiment of the present invention.

Referring to FIGS. 8A to 8E, the support member 2500 according to the embodiment of the present invention may include a first side surface member 2511, a second side surface member 2512, and an upper member 2513.

The first side surface member 2511 may be connected to the upper member 2513. One end of the first side surface member 2511 may be connected to one end of the upper member 2513. A first support portion 2521 may be disposed on an upper surface of the first side surface member 2511. The first support portion 2521 of the first side surface member 2511 may be disposed on the upper surface of the first side surface member 2511 along the second axis RX2. The first support portion 2521 may be formed in a hemispherical shape. In this case, the second axis RX2 may pass through a cross section and center of the hemisphere of the first support portion 2521 disposed on the first side surface member 2511. The first support portion 2521 disposed on the first side surface member 2511 may be disposed in the accommodating groove of the lens holder and the accommodating groove of the optical path changing member holder 2400 to support the lens holder and the optical path changing member holder 2400.

The second side surface member 2512 may be connected to the upper member 2513. The one end of the first side surface member 2511 may be connected to the one end of the upper member 2513. Therefore, the second side surface member 2512 may be connected to the first side surface member 2511 through the upper member 2513. A first support portion 2522 may be disposed on an upper surface of the second side surface member 2512. The first support portion 2522 of the second side surface member 2512 may be disposed on the upper surface of the second side surface member 2512 along the second axis RX2. The first support portion 2522 disposed on the second side surface member 2512 may be formed in a hemispherical shape. In this case, the second axis RX2 may pass through a cross section and center of the hemisphere of the first support portion 2522 disposed on the second side surface member 2512. The first support portion 2522 disposed on the second side surface member 2512 may be disposed in the accommodating groove of the lens holder and the accommodating groove of the optical path changing member holder 2400 to support the lens holder and the optical path changing member holder 2400.

As described above, the support member 2500 may include a plurality of first support portions 2521 and 2522. The support member 2500 may include the first support portion 2521 disposed on the upper surface of the first side surface member 2511 and the first support portion 2522 disposed on the upper surface of the second side surface member 2512. The first support portion 2522 disposed on the upper surface of the second side surface member 2512 may be spaced apart from the first support portion 2521 disposed on the upper surface of the first side surface member 2511 in the Y-axis direction. The first support portion 2522 disposed on the upper surface of the second side surface member 2512 may be spaced apart from the first support portion 2521 disposed on the upper surface of the first side surface member 2511 in a direction toward the second axis RX2.

The upper member 2513 may be connected to the first side surface member 2511 and the second side surface member 2512. One end of the upper member 2513 may be connected to the one end of the first side surface member 2511, and the other end of the upper member 2513 may be connected to one end of the second side surface member 2512. Second support portions 2531 and 2532 may be disposed on a lower end surface of the upper member 2513. The number of the second support portions 2531 and 2532 may be one, but is not limited thereto, and the second support portions 2531 and 2532 may be formed as a plurality of second support portions. The second support portions 2531 and 2532 may be disposed along the first axis RX1. When a plurality of second support portions 2531 and 2532 are provided, the plurality of second support portions 2531 and 2532 may be disposed side by side along the first axis RX1 and disposed to be spaced apart from each other. The second support portions 2531 and 2532 may be disposed in accommodating grooves formed in the frame 2600 to be described below. The second support portions 2531 and 2532 may be formed in a hemispherical shape. In this case, the first axis RX1 may pass through cross sections and centers of the hemispheres of the second support portions 2531 and 2532.

FIG. 9A is a perspective view of a frame according to the embodiment of the present invention. FIG. 9B is a plan view of the frame according to the embodiment of the present invention.

Referring to FIGS. 9A and 9B, the frame 2600 according to the embodiment of the present invention may include a first side surface member 2611, a second side surface member 2612, a third side surface member 2613, and a lower member 2614. The frame 2600 according to the embodiment of the present invention may include an accommodating space surrounded by the first side surface member 2611, the second side surface member 2612, the third side surface member 2613, and the lower member 2614. The accommodating space included in the frame 2600 may be a space of which an upper surface and one side surface are open, and the open one side surface of the accommodating space may be an one side surface in a direction that is the same as that of the open one side surfaces of the accommodating spaces of the lens holder and the optical path changing member holder 2400. The support member 2500 may be disposed in the accommodating space of the frame 2600.

The first side surface member 2611 may be connected to the lower member 2614 and the third side surface member 2613. An opening 2615 may be formed in the first side surface member 2611. A magnet coupled to the support member 2500 may be positioned in the opening 2615 of the first side surface member 2611.

The second side surface member 2612 may be connected to the lower member 2614 and the third side surface member 2613. The second side surface member 2612 may be disposed to face the first side surface member 2611. An opening 2616 may be formed in the second side surface member 2612. A magnet coupled to the support member 2500 may be positioned in the opening 2616 of the second side surface member 2612.

The third side surface member 2613 may be connected to the lower member 2614, the first side surface member 2611, and the second side surface member 2612. An opening 2617 may be formed in the third side surface member 2613. A magnet to be disposed on the lens holder may be positioned in the opening 2617 of the third side surface member 2613.

The lower member 2614 may be connected to the first side surface member 2611, the second side surface member 2612, and the third side surface member 2613. An opening 2618 may be formed in the lower member 2614. A magnet disposed on the optical path changing member holder 2400 may be positioned in the opening 2618 of the lower member 2614.

At least one accommodating groove may be disposed in one side of an upper surface of the lower member 2614. According to one embodiment, the lower member 2614 may include a first accommodating groove 2620 and a second accommodating groove 2630. The first accommodating groove 2620 and the second accommodating groove 2630 may be disposed side by side in the X-axis direction. The first accommodating groove 2620 and the second accommodating groove 2630 may be disposed side by side along the first axis. The first accommodating groove 2620 may be a groove surrounded by the first seating surface 2621, the second seating surface 2622, the third seating surface 2623, the fourth seating surface 2624, and the bottom surface 2625. The first accommodating groove 2620 may have a shape that is open upward from the frame 2600. The first seating surface 2621 may be connected to the second seating surface 2622, the fourth seating surface 2624, and the bottom surface 2625. The second seating surface 2622 may be connected to the first seating surface 2621, the third seating surface 2623, and the bottom surface 2625. The third seating surface 2623 may be connected to the second seating surface 2622, the fourth seating surface 2624, and the bottom surface 2625. The fourth seating surface 2624 may be connected to the first seating surface 2621, the third seating surface 2623, and the bottom surface 2625. The bottom surface 2625 may be connected to the first seating surface 2621, the second seating surface 2622, the third seating surface 2623, and the fourth seating surface 2624. The first seating surface 2621 may be disposed to face and be spaced apart from the third seating surface 2623, and the second seating surface 2622 may be disposed to face and be spaced apart from the fourth seating surface 2624. The first seating surface 2621, the second seating surface 2622, the third seating surface 2623, and the fourth seating surface 2624 may have a predetermined inclination in the Z-axis direction. Therefore, the first accommodating groove 2620 may have a shape that becomes narrower from top to bottom in the Z-axis direction. A second support portion may be disposed in the first accommodating groove 2620, and the first seating surface 2621, the second seating surface 2622, the third seating surface 2623, and the fourth seating surface 2624 may come into contact with the second support portion.

The second accommodating groove 2630 may be a groove surrounded by the first seating surface 2631, the second seating surface 2632, the third seating surface 2633, the fourth seating surface 2634, and the bottom surface 2635. The second accommodating groove 2630 may have a shape that is open upward from the frame 2600. The first seating surface 2631 may be connected to the second seating surface 2632, the fourth seating surface 2634, and the bottom surface 2635. The second seating surface 2632 may be connected to the first seating surface 2631, the third seating surface 2633, and the bottom surface 2635. The third seating surface 2633 may be connected to the second seating surface 2632, the fourth seating surface 2634, and the bottom surface 2635. The fourth seating surface 2634 may be connected to the first seating surface 2631, the third seating surface 2633, and the bottom surface 2635. The bottom surface 2635 may be connected to the first seating surface 2631, the second seating surface 2632, the third seating surface 2633, and the fourth seating surface 2634. The first seating surface 2631 may be disposed to face and be spaced apart from the third seating surface 2633, and the second seating surface 2632 may be disposed to face and be spaced apart from the fourth seating surface 2634. The first seating surface 2631, the second seating surface 2632, the third seating surface 2633, and the fourth seating surface 2634 may have a predetermined inclination in the Z-axis direction. Therefore, the second accommodating groove 2630 may have a shape that becomes narrower from top to bottom in the Z-axis direction. A second support portion may be disposed in the second accommodating groove 2630, and the first seating surface 2631, the second seating surface 2632, the third seating surface 2633, and the fourth seating surface 2634 may come into contact with the second support portion.

FIG. 10 is a first cross-sectional view of the lens driving device according to the embodiment of the present invention.

FIG. 10 illustrates a cross-sectional view of the lens driving device according to the embodiment of the present invention in the Y-axis direction.

Referring to FIGS. 6A to 9B and FIG. 10 described above, the first support portion may simultaneously support the lens holder 2200 and the optical path changing member holder 2400. Specifically, the first support portion disposed on the first side surface member of the support member 2500 may be disposed to be accommodated in both of the accommodating groove disposed in the first side surface member of the lens holder 2200 and the accommodating groove disposed in the optical path changing member holder 2400. In other words, a portion of the first support portion disposed on the first side surface member of the support member 2500 may be disposed to be accommodated in the accommodating groove disposed in the first side surface member of the lens holder 2200, and the remaining portions of the first support portion disposed on the first side surface member of the support member 2500 may also be disposed to be accommodated in the accommodating groove disposed in the optical path changing member holder 2400. In addition, the first support portion disposed on the second side surface member of the support member 2500 may be disposed to be accommodated in both of the accommodating groove disposed in the second side surface member of the lens holder 2200 and the accommodating groove disposed in the optical path changing member holder 2400. In other words, a portion of the first support portion disposed on the second side surface member of the support member 2500 may be disposed to be accommodated in the accommodating groove disposed in the second side surface member of the lens holder 2200, and the remaining portions of the first support portion disposed on the second side surface member of the support member 2500 may also be disposed to be accommodated in the accommodating groove disposed in the optical path changing member holder 2400.

Referring to FIGS. 6A to 9B and FIG. 10 described above, the lens holder 2200 and the optical path changing member holder 2400 may be disposed to be spaced a first distance d1 from each other. The side surface member of the lens holder 2200 and the side surface member of the optical path changing member facing the side surface member of the lens holder 2200 may be disposed to be spaced the first distance d1 from each other. The first side surface member of the lens holder 2200 and the first side surface member of the optical path changing member facing the first side surface member of the lens holder 2200 may be disposed to be spaced the first distance d1 from each other. The second side surface member of the lens holder 2200 and the second side surface member of the optical path changing member facing the second side surface member of the lens holder 2200 may be disposed to be spaced the first distance d1 from each other. Therefore, friction may not occur between the lens holder 2200 and the optical path changing member holder 2400 when the lens holder 2200 and the optical path changing member holder 2400 rotate about the second axis, and it is possible to reduce driving power and improve durability.

Referring to FIGS. 6A to 9B and FIG. 10 described above, the lens holder 2200 and the frame 2600 may be disposed to be spaced a second distance d2 from each other. The side surface member of the lens holder 2200 and the side surface member of the frame 2600 facing the side surface member of the lens holder 2200 may be disposed to be spaced the second distance d2 from each other. The first side surface member of the lens holder 2200 and the first side surface member of the frame 2600 facing the first side surface member of the lens holder 2200 may be disposed to be spaced the second distance d2 from each other. The second side surface member of the lens holder 2200 and the second side surface member of the frame 2600 facing the second side surface member of the lens holder 2200 may be disposed to be spaced the second distance d2 from each other. According to one embodiment of the present invention, the second distance d2 may be a distance in a range of 0.2 to 1 mm. When the second distance d2 is 0.2 mm or more, it is possible to secure a space in which interference with the frame 2600 may not occur even when the lens holder 2200 rotates or tilts about the second axis. In addition, when the second distance d2 is 1 mm or less, the lens holder 2200 may function as a stopper when rotating or tilting about the second axis, thereby improving tilt/rotation control accuracy.

Referring to FIGS. 6A to 9B and FIG. 10 described above, the support member 2500 and the frame 2600 may be disposed to be spaced a third distance d3 from each other. The first side surface member of the support member 2500 and the lower member of the frame 2600 facing the first side surface member of the support member 2500 may be disposed to be spaced the third distance d3 from each other. The second side surface member of the support member 2500 and the lower member of the frame 2600 facing the second side surface member of the support member 2500 may be disposed to be spaced the third distance d3 from each other. According to one embodiment of the present invention, the third distance d3 may be a distance in a range of 0.2 to 1 mm. When the third distance d3 is 0.2 mm or more, it is possible to secure a space in which interference with the frame 2600 may not occur even when the support member 2500 rotates or tilts about the second axis. In addition, when the third distance d3 is 1 mm or less, the support member 2500 may function as a stopper when rotating or tilting about the second axis, thereby improving tilt or rotation control accuracy.

FIG. 11 is a second cross-sectional view of the lens driving device according to the embodiment of the present invention.

FIG. 11 illustrates a cross-sectional view of the lens driving device according to the embodiment of the present invention in the X-axis direction.

Referring to FIGS. 6A to 9B and FIG. 11 described above, the second support portion may be disposed in the accommodating groove of the frame 2600. The second support portion may support the support member 2500 with respect to the frame 2600.

The second support portion may be disposed to be spaced a fourth distance d4 from a bottom surface of the accommodating groove of the frame 2600. Therefore, a predetermined space may be formed between the second support portion and the bottom surface of the accommodating groove of the frame 2600. As the second support portion is spaced the fourth distance d4 from the bottom surface of the accommodating groove of the frame 2600 to form the predetermined space, since friction does not occur against the bottom surface of the accommodating groove of the frame 2600 when the support member 2500 tilts or rotates, it is possible to reduce power consumption and facilitate control. According to the embodiment of the present invention, the fourth distance d4 may be 0.1 mm or more.

According to one embodiment, a height r of the second support portion may be greater than a depth of the accommodating groove. The height r of the second support portion may be a distance to an end of the second support portion protruding from one surface of the support member on which the second support portion is disposed. The height r of the second support portion may be a radius of a sphere when the second support portion has a hemispherical shape. The height r of the second support portion may be greater than a depth d5 of the accommodating groove by 0.15 mm or more. In other words, a difference between the height r of the second support portion and the depth d5 of the accommodating groove may be 0.15 mm or more. Therefore, when the support member 2500 tilts/rotates about the first axis with respect to the frame 2600, interference may not occur between the support member 2500 and the frame 2600. On the other hand, the height r of the second support portion may be greater than the depth d5 of the accommodating groove by 0.3 mm or less. In other words, a difference between the height r of the second support portion and the depth of the accommodating groove may be 0.3 mm or less. When the height r of the second support portion is set to be much larger than the depth d5 of the accommodating groove, a problem that the support member 2500 is separated from the frame 2600 when the support member 2500 tilts/rotates about the first axis with respect to the frame 2600 may occur. Therefore, according to the present invention, it is possible to secure control stability by setting the height r of the second support portion to be greater than the depth d5 of the accommodating groove by 0.3 mm or less. Therefore, the height r of the second support portion may be set to be greater than the depth d5 of the accommodating groove by a length of 0.15 to 0.3 mm ($0.15 \text{ mm} \leq r-d5 \leq 0.3 \text{ mm}$). In another embodiment, the depth of the accommodating groove may be set based on the height r of the second support portion. The depth of the second accommodating groove may be 0.5 times or more the height r of the second support portion and may be 0.9 times or less the depth of the accommodating groove ($0.5*r \leq d \leq 0.9*r$).

FIGS. 12A and 12B are views for describing a rotating process of the lens holder according to the embodiment of the present invention. FIGS. 13A and 13B are views for describing a rotating process of the optical path changing member holder according to the embodiment of the present invention.

Referring to FIGS. 12A to 13B, the lens holder 2200 and the optical path changing member holder 2400 may independently rotate or tilt with respect to the support member 2500 about the second axis.

According to one embodiment, the lens holder 2200 may rotate or tilt clockwise with respect to the support member 2500 about the second axis as illustrated in FIG. 12A or rotate or tilt counterclockwise with respect to the support member 2500 about the second axis as illustrated in FIG. 12B.

According to one embodiment, the optical path changing member holder 2400 may rotate or tilt clockwise with respect to the support member 2500 about the second axis as illustrated in FIG. 13A or rotate or tilt counterclockwise with respect to the support member 2500 about the second axis as illustrated in FIG. 13B.

As described above, as the lens holder 2200 and the optical path changing member holder 2400 rotate or tilt clockwise or counterclockwise with respect to the support member 2500 about the second axis, the first lens disposed on the lens holder 2200 and the optical path changing member disposed on the optical path changing member holder 2400 may also rotate or tilt clockwise or counterclockwise with respect to the support member 2500 about the second axis.

FIGS. 14A and 14B are views for describing a rotating process of the support member according to the embodiment of the present invention.

Referring to FIGS. 14A and 14B, the support member 2500 may rotate/tilt with respect to the frame 2600 about the first axis.

According to one embodiment, the support member 2500 may rotate or tilt clockwise with respect to the frame 2600 about the first axis as illustrated in FIG. 14A or rotate or tilt counterclockwise with respect to the frame 2600 about the first axis as illustrated in FIG. 14B.

In this case, the lens holder 2200 and the optical path changing member holder 2400 disposed in the accommodating space of the support member 2500 may also rotate/tilt clockwise or counterclockwise with respect to the frame 2600 about the first axis together with the support member 2500.

Therefore, the first lens disposed on the lens holder 2200 and the optical path changing member disposed on the optical path changing member holder 2400 may also rotate/tilt clockwise or counterclockwise with respect to the frame 2600 about the first axis.

FIG. 15 is a view for describing the arrangement of a first driving unit according to the embodiment of the present invention.

Referring to FIG. 15, the first driving unit according to the embodiment of the present invention may be configured as a plurality of driving units. The first driving unit may include two first magnets 2711 and 2721 and two corresponding first coils 2712 and 2722.

The 1-1 magnet 2711 may be disposed to face the 1-1 coil 2712. The 1-1 magnet 2711 may be disposed on the support member 2500. The 1-1 magnet 2711 may be disposed on the first side surface member of the support member 2500. The 1-1 magnet 2711 may be disposed on an outer surface of the first side surface member of the support member 2500.

The 1-1 coil 2712 may be disposed to face the 1-1 magnet 2711. The 1-1 coil 2712 may be disposed to be spaced a predetermined distance from the 1-1 magnet 2711. The 1-1 coil 2712 may be disposed to be coupled to a board and may receive a current through the board. As the current flows through the 1-1 coil 2712, an electromagnetic force may be generated between the 1-1 coil 2712 and the 1-1 magnet 2711 to provide a driving force to the support member 2500.

The 1-2 magnet 2721 may be disposed to face the 1-2 coil 2722. The 1-2 magnet 2721 may be disposed on the support member 2500. The 1-2 magnet 2721 may be disposed on the second side surface member of the support member 2500. The 1-2 magnet 2721 may be disposed on an outer surface of the second side surface member of the support member 2500.

The 1-2 coil 2722 may be disposed to face the 1-2 magnet 2721. The 1-2 coil 2722 may be disposed to be spaced a predetermined distance from the 1-2 magnet 2721. The 1-2 coil 2722 may be disposed to be coupled to a board and may receive a current through the board. As the current flows through the 1-2 coil 2722, an electromagnetic force may be generated between the 1-2 coil 2722 and the 1-2 magnet 2721 to provide a driving force to the support member 2500.

FIG. 16 is a view for describing the arrangement of a second driving unit according to the embodiment of the present invention.

Referring to FIG. 16, the second driving unit 2730 according to the embodiment of the present invention may include a second magnet 2731 and a second coil 2732.

The second magnet 2731 may be disposed to face the second coil 2732. The second magnet 2731 may be disposed on the optical path changing member holder 2400. The second magnet 2731 may be disposed on the third side surface member of the optical path changing member holder 2400. The second magnet 2731 may be disposed on a lower surface of the third side surface member of the optical path changing member holder 2400. A seating member on which the second magnet 2731 may be placed may be formed on the lower surface of the third side surface member. In other words, the second magnet 2731 may be disposed on the seating member formed on the lower surface of the third side surface member.

The second coil 2732 may be disposed to face the second magnet 2731. The second coil 2732 may be disposed to be spaced a predetermined distance from the second magnet 2731. The second coil 2732 may be disposed to be coupled to the board and may receive a current through the board. As the current flows through the second coil 2732, an electromagnetic force may be generated between the second coil 2732 and the second magnet 2731 to provide a driving force to the optical path changing member holder 2400.

FIG. 17 is a view for describing the arrangement of a third driving unit according to the embodiment of the present invention.

Referring to FIG. 17, the third driving unit 2740 according to the embodiment of the present invention may include a third magnet 2741 and a third coil 2742.

The third magnet 2741 may be disposed to face the third coil 2742. The third magnet 2741 may be disposed on the lens holder 2200. The third magnet 2741 may be disposed on the fourth side surface member of the lens holder 2200. The third magnet 2741 may be disposed on an outer surface of the fourth side surface member of the lens holder 2200.

The third coil 2742 may be disposed to face the third magnet 2741. The third coil 2742 may be disposed to be spaced a predetermined distance from the third magnet 2741. The third coil 2742 may be disposed to be coupled to the board and may receive a current through the board. As the current flows through the third coil 2742, an electromagnetic force may be generated between the third coil 2742 and the third magnet 2741 to provide a driving force to the lens holder 2200.

FIG. 18 is a configuration diagram of a camera module according to an embodiment of the present invention.

Referring to FIG. 18, the camera module 100 according to the embodiment of the present invention may include a first lens unit 110, an optical unit 120, a second lens unit 130, a sensor unit 140, and a housing 150.

The first lens unit 110 may include at least one lens. According to one embodiment, the first lens unit 110 may be formed of one lens. In another embodiment, the first lens unit 110 may be formed of a plurality of lenses. The first lens unit 110 may have a different number of lenses depending on applications to which the camera module 100 is applied.

The first lens unit 110 may receive light. The first lens unit 110 may receive light incident from a subject. The first lens unit 110 may include at least one light receiving lens. The first lens unit 110 may condense light. The first lens unit 110 may condense light incident from the subject. The first lens unit 110 may include at least one light condensing lens.

The first lens unit 110 may have positive (+) power. When the first lens unit 110 is formed of a lens group including a plurality of lenses, the entirety of the lens group may have the positive (+) power. When the first lens unit 110 is formed of one lens, the one lens may have the positive (+) power.

The first lens unit 110 may include at least one lens having a thickness of an edge portion of an effective diameter smaller than a thickness of a central portion of the effective diameter. When the first lens unit 110 is formed of a lens group including a plurality of lenses, at least one of the plurality of lenses may have the thickness of the edge portion of the effective diameter smaller than the thickness of the central portion of the effective diameter. When the first lens unit 110 is formed of one lens, the one lens may have the thickness of the edge portion of the effective diameter smaller than the thickness of the central portion of the effective diameter.

The first lens unit 110 may include at least one convex lens. When the first lens unit 110 is formed of a lens group including a plurality of lenses, at least one of the plurality of lenses may be a convex lens. When the first lens unit 110 is formed of one lens, the one lens may be a convex lens.

By constituting the first lens unit 110 as described above, the camera module according to the embodiment of the present invention can increase the amount of received light by increasing an F number (Fno).

The first lens unit 110 may move to implement the OIS function of the camera module 100. According to one embodiment, the first lens unit 110 may rotate at an arbitrary angle about an arbitrary axis. The path of incident light may be changed by rotating the first lens unit 110 at the arbitrary angle.

In order to implement the OIS function of the first lens unit 110, the camera module 100 may include a first holder and a first actuator. In other words, the camera module 100 may rotate the first lens unit 110 at an arbitrary angle about an arbitrary rotation axis using the first holder and the first actuator.

Here, the first lens unit 110 may correspond to the above-described first lens.

The first holder may be seated in the housing 150 of the camera module 100. The first lens unit 110 may be seated in an internal accommodating space of the first holder. The first lens unit 110 may be accommodated in the internal accommodating space of the first holder. The first holder may be coupled to the first lens unit 110 through a lens barrel.

Therefore, the first lens unit 110 may move according to the movement of the first holder. Here, the first holder may correspond to the above-described lens holder.

The first actuator may be seated in the housing 150 of the camera module 100. The first actuator may be accommodated in an internal space of the camera module 100. The first actuator may be coupled to the first holder. The first actuator may provide a driving force so that the first holder rotates about an arbitrary rotation axis. According to one embodiment, the first actuator may be a VCM actuator including at least one magnet and at least one coil facing the same. In this case, the coil or magnet may be coupled to the holder, and the facing magnet or coil may be coupled to the housing 150. In addition, the first actuator may be implemented as an actuator that may provide a driving force to the first holder, such as an encoder actuator or piezo actuator. Here, the first actuator may correspond to the above-described driving unit.

The optical unit 120 may change the path of the light received through the first lens unit 110 and output the light. The optical unit 120 may reflect the light incident from the first lens unit 110 and output the light to the second lens unit 130.

According to one embodiment, the optical unit 120 may be configured as a prism. The prism may include a first surface on which light is incident from the first lens unit 110, a second surface from which the light incident through the first surface is reflected, and a third surface through which the light reflected by the second surface is output. According to one embodiment, the optical unit 120 may be configured as a mirror. The mirror may include a reflective surface that reflects the light input from the first lens unit 110. As described above, the optical unit 120 may reflect the light incident from the outside (e.g., an object) to the inside of the camera module 100. For example, the optical unit 120 may reflect the incident light toward the image sensor. Therefore, it should be understood that the camera module 100 may provide a high range of magnification by extending the optical path while a thickness thereof is minimized.

The optical unit 120 may move to implement the OIS function of the camera module 100. According to one embodiment, the optical unit 120 may rotate at an arbitrary angle about an arbitrary axis. The path of the reflected light may be changed by rotating the optical unit 120 at the arbitrary angle.

In order to implement the OIS function of the optical unit 120, the camera module 100 may include a second holder and a second actuator. In other words, the camera module 100 may rotate the optical unit 120 at an arbitrary angle about an arbitrary rotation axis using the second holder and the second actuator.

Here, the optical unit 120 may correspond to the above-described optical path changing member.

The second holder may be seated in the housing 150 of the camera module 100. The optical unit 120 may be seated in an internal accommodating space of the second holder. The optical unit 120 may be accommodated in the internal accommodating space of the second holder. The second holder may be coupled to the optical unit 120 through a lens barrel. Therefore, the optical unit 120 may move according to the movement of the second holder.

Here, the second holder may correspond to the above-described optical path changing member holder.

The second actuator may be seated in the housing 150 of the camera module 100. The second actuator may be accommodated in the internal space of the camera module 100. The second actuator may be coupled to the second holder. The second actuator may provide a driving force so that the second holder rotates about an arbitrary rotation axis. According to one embodiment, the second actuator may be a VCM actuator including at least one magnet and at least one coil facing the same. In this case, the coil or magnet may be coupled to the holder, and the facing magnet or coil may be coupled to the housing 150. In addition, the second actuator may be implemented as an actuator that may provide a driving force to the second holder, such as an encoder actuator or piezo actuator.

Here, the second actuator may correspond to the above-described driving unit.

The second lens unit 130 may receive light emitted from the optical unit 120. The second lens unit 130 may receive light reflected by the optical unit 120. The second lens unit 130 may output the received light to the image sensor unit 140.

The second lens unit 130 may include a plurality of lenses. The plurality of lenses may form at least one lens group. Therefore, the second lens unit 130 may include at least one lens group. The at least one lens group may provide a zooming function or focusing function to the camera module 100 by moving along an optical axis of the second lens unit 130. For example, the second lens unit 130 may be formed of the first to third lens groups, the first lens group may be fixed, the second lens group may move along the optical axis to provide the zooming function, and the third lens group may move along the optical axis to provide the focusing function.

In order to implement at least one of the zooming and focusing functions of the second lens unit 130, the camera module 100 may include a third holder and a third actuator. In other words, the camera module 100 may perform at least one of the zooming and focusing by moving the second lens unit 130 along the optical axis using the third holder and the third actuator.

The third holder may be seated in the housing 150 of the camera module 100. The second lens unit 130 may be seated in an internal accommodating space of the third holder. The second lens unit 130 may be accommodated in the internal accommodating space of the third holder. The third holder may be coupled to the second lens unit 130 through a lens barrel. Therefore, the second lens unit 130 may move according to the movement of the third holder. When the second lens unit 130 includes at least one lens group, the third holder may be coupled to each of the at least one lens group. The at least one lens group may be coupled to each third holder through each lens barrel. Therefore, the at least one lens group may independently move according to the movement of the third holder coupled to each lens group.

The third actuator may be seated in the housing 150 of the camera module 100. The third actuator may be accommodated in the internal space of the camera module 100. The third actuator may be coupled to the third holder. The third actuator may provide a driving force so that the third holder moves in the optical axis direction of the second lens group. The third holder moves in the optical axis direction of the second lens group so that the second lens unit 130 moves in the optical axis direction. When the second lens unit 130 includes at least one lens group, the third actuator may be coupled to the third holder to provide an independent driving force to each of the least one lens group. For example, when the second lens unit 130 includes the first to third lens groups and among them, the second lens group and the third lens group move, the third actuator may be coupled to provide an independent driving force to each of the second lens group and the third lens group.

According to one embodiment, the third actuator may be a VCM actuator including at least one magnet and at least one coil facing the same. In this case, the coil or magnet may be coupled to the holder, and the facing magnet or coil may be coupled to the housing 150. In addition, the third actuator may be implemented as an actuator that may provide a driving force to the third holder, such as an encoder actuator or piezo actuator.

The image sensor unit 140 may receive light output from the second lens unit 130. The image sensor unit 140 may convert the received light into an electrical signal and output the light.

FIGS. 19 and 20 are views of some components of the camera module according to the embodiment of the present invention viewed from one.

FIG. 19 is a view of the first lens unit 110, the optical unit 120, the second lens unit 130, and the sensor unit 140 according to the embodiment of the present invention viewed in the Y-axis direction, and FIG. 20 is a view of the first lens unit 110, the optical unit 120, the second lens unit 130, and the sensor unit 140 according to the embodiment of the invention viewed in the X-axis direction.

In FIGS. 19 and 20, an X-axis may be an axis that is parallel to a horizontal axis of the camera module 100. The X-axis may be parallel to the optical axis of the second lens unit 130. The X-axis may be perpendicular to a light receiving surface of the sensor unit 140. A Y-axis may be parallel to a vertical axis of the camera module 100. The Y-axis may be parallel to a horizontal axis of the light receiving surface of the sensor unit 140. The Y-axis may be perpendicular to the horizontal axis of the light receiving surface of the sensor unit 140. The Y-axis may be perpendicular to the optical axis of the second lens unit 130. AZ-axis may be parallel to a height axis of the camera module 100. The Z-axis may be perpendicular to the vertical axis of the light receiving surface of the sensor unit 140. The Z-axis may be perpendicular to the horizontal axis of the light receiving surface of the sensor unit 140. The Z-axis may be perpendicular to the optical axis of the second lens unit 130.

Referring to FIGS. 19 and 20, the first lens unit 110, the optical unit 120, and the second lens unit 130 may be sequentially arranged from an object side to an image side. Specifically, the first lens unit 110 may be disposed at an object side of the optical unit 120. The optical unit 120 may be disposed at an image side of the first lens unit 110. The second lens unit 130 may be disposed at the image side of the optical unit 120. Therefore, the light incident on the camera module 100 may be input to the sensor unit 140 after sequentially passing through the first lens unit 110, the optical unit 120, and the second lens unit 130. The light incident through the first lens unit 110 may be reflected from the reflective surface of the optical unit 120, and the light reflected from the reflective surface may be input to the sensor unit 140 through the second lens unit 130.

According to one embodiment, in a reference state, that is, in a state in which the first lens unit 110 and the optical unit 120 do not move, a first optical axis OX1 and a second optical axis OX2 of the first lens unit 130 may be perpendicular to each other. An intersection at which the first optical axis OX1 and the second optical axis OX2 intersect may be formed on the reflective surface of the optical unit 120. An angle (i.e., an angle of incidence θ1) formed by a perpendicular line Perp of the reflective surface passing through the intersection and the first optical axis OX1 may be the same as an angle (i.e., a reflective angle θ2) formed by the perpendicular line Perp and the second rotation axis RX2. Therefore, the light incident through the first lens unit 110 along the first optical axis OX1 may be reflected from the reflective surface of the optical unit 120 and output to the second lens unit 130 along the second optical axis OX2.

The first lens unit 110 and the optical unit 120 may rotate about rotation axes. The first lens unit 110 and the optical unit 120 may rotate at predetermined angles about the first rotation axis RX1 or rotate at predetermined angles about the second rotation axis RX2. The first lens unit 110 and the optical unit 120 can implement the OIS function by rotating about the first rotation axis RX1 or the second rotation axis RX2, which is the rotation axis. In other words, the rotation axis may be at least one of the first rotation axis RX1 or the second rotation axis RX2. Here, the first rotation axis RX1 may correspond to the above-described first axis, and the second rotation axis RX2 may correspond to the above-described second axis.

According to one embodiment, the first lens unit 110 and the optical unit 120 may rotate at predetermined angles about the first rotation axis RX1. In other words, the first lens unit 110 and the optical unit 120 may rotate clockwise or counterclockwise using the first rotation axis RX1 as a rotation axis. Here, the first rotation axis RX1 may be an axis perpendicular to the first optical axis OX1 and the second optical axis OX2. The first axis may be an axis that passes through the intersection of the first optical axis OX1 and the second optical axis OX2 and is perpendicular to the first optical axis OX1 and the second optical axis OX2. The first rotation axis RX1 may be an axis that passes through the intersection of the first optical axis OX1 and the second optical axis OX2 and is parallel to the Y-axis. The first rotation axis RX1 may be an axis that passes through the intersection of the first optical axis OX1 and the second optical axis OX2 and is perpendicular to the X-axis and Z-axis. The first rotation axis RX1 may be perpendicular to the second rotation axis RX2.

According to another embodiment, the first lens unit 110 and the optical unit 120 may rotate at predetermined angles about the second rotation axis RX2. In other words, the first lens unit 110 and the optical unit 120 may rotate clockwise or counterclockwise using the second rotation axis RX2 as a rotation axis. Here, the second rotation axis RX2 may be an axis perpendicular to the first optical axis OX1 and the first rotation axis RX1. The second rotation axis RX2 may be an axis that passes through the intersection of the first optical axis OX1 and the second optical axis OX2 and is perpendicular to the first optical axis OX1 and the first rotation axis RX1. The second rotation axis RX2 may be an axis that passes through the intersection of the first optical axis OX1 and the second optical axis OX2 and is parallel to the X-axis. The second rotation axis RX2 may be an axis that passes through the intersection of the first optical axis OX1 and the second optical axis OX2 and is perpendicular to the Y-axis and Z-axis. The second rotation axis RX2 may be perpendicular to the first rotation axis RX1. The second rotation axis RX2 may be the second optical axis OX2.

The first lens unit 110 and the optical unit 120 may rotate in the same direction. According to one embodiment, when the optical unit 120 rotates clockwise using the first rotation axis RX1 as a rotation axis, the first lens unit 110 may rotate clockwise using the first rotation axis RX1 as a rotation axis. According to one embodiment, when the optical unit 120 rotates counterclockwise using the first rotation axis RX1 as a rotation axis, the first lens unit 110 may rotate counterclockwise using the first rotation axis RX1 as a rotation axis. According to one embodiment, when the optical unit 120 rotates clockwise using the second rotation axis RX2 as a rotation axis, the first lens unit 110 may rotate clockwise using the second rotation axis RX2 as a rotation axis. According to one embodiment, when the optical unit 120 rotates counterclockwise using the second rotation axis RX2 as a rotation axis, the first lens unit 110 may rotate counterclockwise using the second rotation axis RX2 as a rotation axis.

The rotation angles of the first lens unit 110 and the optical unit 120 may differ from or the same as each other depending on which rotation axis they rotate about. According to one embodiment, when the first lens unit 110 and the optical unit 120 rotate clockwise or counterclockwise using the first rotation axis RX1 as a rotation axis, the first lens unit 110 and the optical unit 120 may rotate at different rotation angles. According to one embodiment, when the first lens unit 110 and the optical unit 120 rotate clockwise or counterclockwise using the second rotation axis RX2 as a rotation axis, the first lens unit 110 and the optical unit 120 may rotate at the same rotation angle.

FIGS. 21 and 22 are views for describing rotation mechanism of a first lens unit and an optical unit according to a first embodiment of the present invention.

According to the embodiment of the present invention, when the first lens unit 110 and the optical unit 120 rotate using the first rotation axis RX1 as a rotation axis, the first lens unit 110 and the optical unit 120 may rotate at different rotation angles. A first rotation angle RA1 at which the first lens unit 110 rotating about the first rotation axis RX1 may differ from a second rotation angle RA2 at which the optical unit 120 rotating about the first rotation axis RX1. The first rotation angle RA1 at which the first lens unit 110 rotating about the first rotation axis RX1 may be greater than the second rotation angle RA2 at which the optical unit 120 rotating about the first rotation axis RX1. According to one embodiment, the second rotation angle RA2 may be twice the first rotation angle RA1. In this case, since there may be errors occurring in a process of implementing the rotation of the first lens unit 110 and the optical unit 120, the second rotation angle RA2 may not be exactly twice the first rotation angle RA1 and may have an error value. Considering this error, the second rotation angle RA2 may have a value between 1.9 and 2.1 times the first rotation angle RA1. Considering this error, the second rotation angle RA2 may have a value between 1.95 and 2.05 times the first rotation angle RA1.

Referring to FIG. 21, the first lens unit 110 and the optical unit 120 may rotate counterclockwise using the first rotation axis RX1 as a rotation axis. The first lens unit 110 may rotate counterclockwise at the first rotation angle RA1 using the first rotation axis RX1 as a rotation axis. In addition, the optical unit 120 may rotate counterclockwise at the second rotation angle RA2 using the first rotation axis RX1 as a rotation axis. As the optical unit 120 rotates using the first rotation axis RX1 as a rotation axis, the reflective surface of the optical unit 120 may be tilted. The reflective surface of the optical unit 120 may be tilted in a vertical direction of the sensor unit 140 at the second rotation angle RA2. The light incident along the optical axis of the first optical unit 120 may be incident on the reflective surface of the optical unit 120 tilted in the vertical direction of the sensor unit 140 at the second rotation angle RA2. In addition, light reflected by the tilted reflective surface may be output toward the second optical unit 120, may pass through the second optical unit 120, and may be input to the sensor unit 140.

Referring to FIG. 22, the first lens unit 110 and the optical unit 120 may rotate clockwise using the first rotation axis RX1 as a rotation axis. The first lens unit 110 may rotate clockwise at the first rotation angle RA1 using the first rotation axis RX1 as a rotation axis. In addition, the optical unit 120 may rotate clockwise at the second rotation angle RA2 using the first rotation axis RX1 as a rotation axis. As the optical unit 120 rotates using the first rotation axis RX1 as a rotation axis, the reflective surface of the optical unit 120 may be tilted. The reflective surface of the optical unit 120 may be tilted in a vertical direction of the sensor unit 140 at the second rotation angle RA2. The light incident along the optical axis of the first optical unit 120 may be incident on the reflective surface of the optical unit 120 tilted in the vertical direction of the sensor unit 140 at the second rotation angle RA2. In addition, light reflected by the tilted reflective surface may be output toward the second lens unit 130, may pass through the second lens unit 130, and may be input to the sensor unit 140.

When the first lens unit 110 and the optical unit 120 rotate using the first rotation axis RX1 as a rotation axis, the first rotation angle RA1 may be twice the second rotation angle RA2. As the first rotation angle RA1 becomes twice the second rotation angle RA2, the angle formed by the perpendicular line Perp of the reflective surface moved by the rotation of the optical unit 120 and the first optical axis OX1 may become the same as the angle formed by the perpendicular line Perp of the reflective surface moved by the rotation of the optical unit 120 and the second optical axis OX2. In other words, a path of the first optical axis OX1 reflected by the reflective surface and the second optical axis OX2 of the second lens unit 130 may match. Therefore, it is possible to not only increase the amount of the light received by the first lens unit 110, but also acquire a clear image when the OIS function of the camera module 100 is driven. When the first rotation angle RA1 is not twice the second rotation angle RA2, the path of the first optical axis OX1 reflected by the reflective surface and the second optical axis OX2 of the second lens unit 130 do not match. In this case, the amount of the light received can be increased by the first lens unit 110, but a problem that the clarity of the acquired image is degraded occurs.

FIGS. 23 and 24 are views for describing a rotational structure of a first lens unit and an optical unit according to a second embodiment of the present invention.

According to the embodiment of the present invention, when the first lens unit 110 and the optical unit 120 rotate using the second rotation axis RX2 as a rotation axis, the first lens unit 110 and the optical unit 120 may rotate at the same rotation angle. When the first lens unit 110 rotates about the second rotation axis RX2 at a third rotation angle RA3, the optical unit 120 may also rotate about the second rotation axis RX2 at the third rotation angle RA3. In this case, since there may be errors occurring in the process of implementing the rotation of the first lens unit 110 and the optical unit 120, the third rotation angle RA3 at which the first lens unit 110 rotates and the third rotation angle RA3 at which the optical unit 120 rotates may not exactly match and may have an error value.

Referring to FIG. 23, the first lens unit 110 and the optical unit 120 may rotate counterclockwise using the second rotation axis RX2 as a rotation axis. The first lens unit 110 may rotate counterclockwise at the third rotation angle RA3 using the second rotation axis RX2 as a rotation axis. In addition, the optical unit 120 may rotate counterclockwise at the third rotation angle RA3 using the second rotation axis RX2 as a rotation axis. As the optical unit 120 rotates using the first rotation axis RX1 as a rotation axis, the reflective surface of the optical unit 120 may be tilted. The reflective surface of the optical unit 120 may be tilted in a left-right direction of the sensor unit 140 at the third rotation angle RA3. The light incident along the optical axis of the first optical unit 120 may be incident on the reflective surface of the optical unit 120 tilted in the left-right direction of the sensor unit 140 at the third rotation angle RA3. In addition, light reflected by the tilted reflective surface may be output toward the second lens unit 130, may pass through the second lens unit 130, and may be input to the sensor unit 140.

Referring to FIG. 24, the first lens unit 110 and the optical unit 120 may rotate clockwise using the second rotation axis RX2 as a rotation axis. The first lens unit 110 may rotate clockwise at the third rotation angle RA3 using the second rotation axis RX2 as a rotation axis. In addition, the optical unit 120 may rotate clockwise at the third rotation angle RA3 using the second rotation axis RX2 as a rotation axis. As the optical unit 120 rotates using the second rotation axis RX2 as a rotation axis, the reflective surface of the optical unit 120 may be tilted. The reflective surface of the optical unit 120 may be tilted in a left-right direction of the sensor unit 140 at the third rotation angle RA3. The light incident along the optical axis of the first optical unit 120 may be incident on the reflective surface of the optical unit 120 tilted in the left-right direction of the sensor unit 140 at the third rotation angle RA3. In addition, light reflected by the tilted reflective surface may be output toward the second optical unit 120, may pass through the second optical unit 120, and may be input to the sensor unit 140.

As the first lens unit 110 and the optical unit 120 rotate at the third rotation angle RA3, the angle formed by the perpendicular line Perp of the reflective surface moved by the rotation of the optical unit 120 and the first optical axis OX1 may become the same as the angle formed by the perpendicular line Perp of the reflective surface moved by the rotation of the optical unit 120 and the second optical axis OX2. In other words, a path of the first optical axis OX1 reflected by the reflective surface and the second optical axis OX2 of the second lens unit 130 may match. Therefore, it is possible to not only increase the amount of the light received by the first lens unit 110, but also acquire a clear image when the OIS function of the camera module 100 is driven. When the rotating angles of the first lens unit 110 and the optical unit 120 are not the same, the path of the first optical axis OX1 reflected by the reflective surface and the second optical axis OX2 of the second lens unit 130 do not match. In this case, the amount of the light received can be increased by the first lens unit 110, but a problem that the clarity of the acquired image is degraded occurs.

FIG. 25 is a perspective view of a mobile terminal to which the camera device according to the embodiment of the present invention is applied.

Referring to FIG. 25, a mobile terminal 1500 according to the embodiment may include the camera device 1000, a flash module 1530, and an AF device 1510, which are provided on a rear surface thereof.

The camera device 1000 may include an image photographing function and an AF function. For example, the camera device 1000 may include the AF function using an image.

The camera device 1000 processes an image frame 2600 of a still image or moving image obtained by an image sensor in a photographing mode or video call mode.

The processed image frame 2600 may be displayed on a predetermined display and stored in a memory. A camera (not illustrated) may also be disposed on a front surface of a body of the mobile terminal.

For example, the camera device 1000 may include a first camera device 1000A and a second camera device 1000B, and the first camera device 1000A may implement an OIS function together with an AF or zooming function. In addition, the second camera device 1000B may implement the AF, zooming, and OIS functions. In this case, since the first camera device 1000A includes both the above-described first camera actuator and second camera actuator, it is possible to easily miniaturize the camera device by changing an optical path.

The flash module 1530 may include a light emitting device for emitting light therein. The flash module 1530 may be operated by an operation of a camera of a mobile terminal or a user's control.

The AF device 1510 may include one of a package of a surface light emitting laser device as a light emitting unit.

The AF device 1510 may include the AF function using a laser. The AF device 1510 may be mainly used in a condition in which the AF function using the image of the camera device 1000 is degraded, for example, in an environment that is close to 10 m or less or dark.

The AF device 1510 may include a light emitting unit including a vertical cavity surface emitting laser (VCSEL) semiconductor device and a light receiving unit for converting light energy into electrical energy, such as a photodiode.

FIG. 26 is a perspective view of a vehicle to which the camera device according to the embodiment of the present invention is applied.

For example, FIG. 26 is a view illustrating an exterior of a vehicle including a vehicle driving assistance device to which the camera device 1000 according to the embodiment of the present invention is applied.

Referring to FIG. 26, a vehicle 700 according to the embodiment may include wheels 13FL and 13FR rotated by a power source and a predetermined sensor. Although the sensor may be a camera sensor 3000, the present invention is not limited thereto.

The camera 3000 may be a camera sensor to which the camera device 1000 according to the embodiment is applied. The vehicle 700 according to the embodiment may acquire image information through the camera sensor 3000 for capturing a forward image or a surrounding image, determine a situation in which a lane line is not identified using the image information, and generate a virtual lane line when the lane line is not identified.

For example, the camera sensor 3000 may acquire a forward image by capturing a view in front of the vehicle 700, and a processor (not illustrated) may acquire image information by analyzing an object included in the front image.

For example, when a lane line, an adjacent vehicle, a traveling obstacle, and objects, such as a median, a curb, or a tree corresponding to an indirect road mark, are captured in the image captured by the camera sensor 3000, the processor may detect the object and include the detected object in the image information. In this case, the processor may further supplement the image information by acquiring information on a distance from the object detected through the camera sensor 3000.

The image information may be information on the object captured in the image. The camera sensor 3000 may include an image sensor and an image processing module.

The camera sensor 3000 may process still images or moving images obtained by the image sensor (e.g., a complementary metal-oxide semiconductor (CMOS) or a charge-coupled device (CCD)).

The image processing module may process the still images or moving images acquired through the image sensor to extract necessary information, and transmit the extracted information to the processor.

In this case, the camera sensor 3000 may include a stereo camera in order to improve the measurement accuracy of the object and further secure information such as a distance between the vehicle 700 and the object, but the present invention is not limited thereto.

Although embodiments have been mainly described above, these are only illustrative and do not limit the present invention, and those skilled in the art to which the present invention pertains can know that various modifications and applications not exemplified above are possible without departing from the essential characteristics of the embodiments. For example, each component specifically illustrated in the embodiments may be implemented by modification. In addition, differences related to these modifications and applications should be construed as being included in the scope of the present invention defined in the appended claims.

The invention claimed is:

1. A lens driving device comprising:
   a first lens;
   an optical path changing member configured to change a path of light incident from the first lens and emit the light;
   a lens holder on which the first lens is disposed; and
   a support member on which the lens holder is disposed,
   wherein the first lens and the optical path changing member are disposed to be simultaneously tilted about a first axis,
   wherein the first lens and the optical path changing member are disposed to be individually tilted about a second axis,
   wherein the lens holder and the optical path changing member are disposed to be supported by the support member and
   wherein the support member includes a plurality of first support portions disposed to be spaced apart from each other in a direction toward the second axis.

2. The lens driving device of claim 1,
   wherein the lens holder is supported by the support member.

3. The lens driving device of claim 2, comprising an optical path changing member holder on which the optical path changing member is disposed,
   wherein the optical path changing member is supported by the support member.

4. The lens driving device of claim 1,
   wherein the lens holder and the optical path changing member are simultaneously supported by the plurality of first support portions.

5. The lens driving device of claim 4, comprising a frame on which a plurality of coils and the support member are disposed,
   wherein the support member includes a second support portion supported by the frame to be tilted about the first axis, and
   the second support portion is provided as a single support portion extending along the second axis or a plurality of support portions disposed along the second axis.

6. The lens driving device of claim 5, comprising:
   a first magnet disposed on the support member;
   a second magnet disposed on the optical path changing member holder; and
   a third magnet disposed on the lens holder, wherein the plurality of coils include first to third coils respectively corresponding to the first to third magnets.

7. The lens driving device of claim 5, wherein a side surface of the lens holder is disposed to be spaced a predetermined distance from a corresponding side surface of the frame.

8. The lens driving device of claim 7, wherein the predetermined distance is in a range of 0.2 to 1.0 mm.

9. The lens driving device of claim 5, wherein a lower surface of the support member is disposed to be spaced a predetermined distance from a corresponding one surface of the frame.

10. The lens driving device of claim 1, wherein the lens holder and the optical path changing member are individually tiltable about the first axis.

11. A lens driving device comprising:

a first lens;

an optical path changing member configured to change a path of light incident from the first lens and emit the light;

a lens holder on which the first lens is disposed; and a support member on which the lens holder is disposed, wherein the first lens and the optical path changing member are disposed to be simultaneously tilted about a first axis, and wherein the first lens and the optical path changing member are disposed to be individually tilted about a second axis, wherein the lens holder and the optical path changing member are disposed to be supported by the support member to be individually tilted about the first axis, wherein the lens holder and the optical path changing member are simultaneously supported by the plurality of first support portions.

* * * * *